(12) United States Patent
Chen et al.

(10) Patent No.: US 9,164,258 B1
(45) Date of Patent: Oct. 20, 2015

(54) IMAGING LENS, AND ELECTRONIC APPARATUS INCLUDING THE SAME

(71) Applicant: Genius Electronic Optical Co., Ltd., Central Taiwan Science Park (TW)

(72) Inventors: Shih-Han Chen, Central Taiwan Science Park (TW); Feng Chen, Fujian (CN); Baina Chen, Fujian (CN)

(73) Assignee: GENIUS ELECTRONIC OPTICAL CO., LTD. (TW)

( * ) Notice: Subject to any disclaimer, the term of this patent is extended or adjusted under 35 U.S.C. 154(b) by 0 days.

(21) Appl. No.: 14/521,659

(22) Filed: Oct. 23, 2014

(30) Foreign Application Priority Data

Jul. 29, 2014 (CN) .......................... 2014 1 0366292

(51) Int. Cl.
*G02B 3/02* (2006.01)
*G02B 13/00* (2006.01)
*G02B 9/62* (2006.01)
*H04N 5/225* (2006.01)

(52) U.S. Cl.
CPC .............. *G02B 13/0045* (2013.01); *G02B 9/62* (2013.01); *H04N 5/2252* (2013.01); *H04N 5/2254* (2013.01)

(58) Field of Classification Search
CPC ....................................................... G02B 9/64
USPC .................................................. 359/713, 714
See application file for complete search history.

(56) References Cited

U.S. PATENT DOCUMENTS

| | | | |
|---|---|---|---|
| 7,595,938 | B2 | 9/2009 | Yamakawa et al. |
| 8,040,618 | B2 | 10/2011 | Kitahara |
| 8,248,715 | B2 | 8/2012 | Asami et al. |
| 8,355,215 | B2 | 1/2013 | Asami |
| 8,432,619 | B2 | 4/2013 | Huang |
| 2012/0069140 | A1 | 3/2012 | Tsai et al. |
| 2012/0162769 | A1* | 6/2012 | Suzuki et al. ................. 359/558 |

FOREIGN PATENT DOCUMENTS

| | | |
|---|---|---|
| TW | M354744 U1 | 4/2009 |
| TW | 201011337 A | 3/2010 |
| TW | 201038968 A1 | 11/2010 |
| TW | 201337319 A | 9/2013 |
| TW | 1416162 B | 11/2013 |
| TW | 201426084 A | 7/2014 |

* cited by examiner

*Primary Examiner* — James Jones
(74) *Attorney, Agent, or Firm* — Baker & McKenzie LLP

(57) ABSTRACT

An imaging lens comprises a first lens element, a second lens element, a third lens element, an aperture stop, a fourth lens element, a fifth lens element and a sixth lens element arranged in order from an object side to an image side along an optical axis of said imaging lens. Through designs of surfaces of the lens elements and relevant optical parameters, a short system length of the imaging lens may be achieved while maintaining good optical performance.

17 Claims, 33 Drawing Sheets system focal length =2.378mm, half field-of-view =70.000°, F-number =2.401, system length=4.300mm

| lens element | surface | radius of curvature | thickness | refractive index | Abbe number | focal length |
|---|---|---|---|---|---|---|
| object | | ∞ | ∞ | | | |
| | | ∞ | 0.200 | | | |
| first lens element 3 | object-side surface 31 | 12.652 | 0.299 | 1.535 | 55.712 | 74.188 |
| | image-side surface 32 | 18.391 | 0.154 | | | |
| second lens element 4 | object-side surface 41 | 1.372 | 0.297 | 1.640 | 23.529 | -4.558 |
| | image-side surface 42 | 0.856 | 0.346 | | | |
| third lens element 5 | object-side surface 51 | 2.179 | 0.451 | 1.544 | 56.114 | 2.667 |
| | image-side surface 52 | -4.067 | 0.093 | | | |
| aperture stop 2 | | ∞ | 0.050 | | | |
| fourth lens element 6 | object-side surface 61 | 2.432 | 0.500 | 1.544 | 56.114 | 1.888 |
| | image-side surface 62 | -1.659 | 0.208 | | | |
| fifth lens element 7 | object-side surface 71 | -5.702 | 0.296 | 1.640 | 23.529 | -2.721 |
| | image-side surface 72 | 2.584 | 0.121 | | | |
| sixth lens element 8 | object-side surface 81 | 6.458 | 0.552 | 1.531 | 55.744 | -17.207 |
| | image-side surface 82 | 3.677 | 0.200 | | | |
| optical filter 9 | object-side surface 91 | ∞ | 0.210 | | | |
| | image-side surface 92 | ∞ | 0.513 | | | |
| image plane 100 | | ∞ | | | | |

FIG. 3

| surface | 31 | 32 | 41 | 42 | 51 | 52 |
|---|---|---|---|---|---|---|
| K | | 0.000E+00 | 0.000E+00 | 0.000E+00 | 0.000E+00 | 0.000E+00 |
| a4 | | 1.010E-01 | -4.059E-01 | -8.576E-01 | -2.539E-01 | -5.071E-01 |
| a6 | spherical | 8.622E-03 | 8.516E-02 | 2.885E-01 | -5.689E-02 | 5.486E-01 |
| a8 | | 0.000E+00 | 0.000E+00 | 0.000E+00 | 1.330E-01 | -3.883E-01 |
| a10 | | 0.000E+00 | 0.000E+00 | 0.000E+00 | 0.000E+00 | 0.000E+00 |
| a12 | | 0.000E+00 | 0.000E+00 | 0.000E+00 | 0.000E+00 | 0.000E+00 |
| a14 | | 0.000E+00 | 0.000E+00 | 0.000E+00 | 0.000E+00 | 0.000E+00 |
| a16 | | 0.000E+00 | 0.000E+00 | 0.000E+00 | 0.000E+00 | 0.000E+00 |

| surface | 61 | 62 | 71 | 72 | 81 | 82 |
|---|---|---|---|---|---|---|
| K | 0.000E+00 | 0.000E+00 | 0.000E+00 | 0.000E+00 | 0.000E+00 | 0.000E+00 |
| a4 | -4.453E-01 | -1.509E-01 | -3.952E-01 | -1.189E-01 | -7.531E-02 | -3.935E-01 |
| a6 | 1.029E+00 | 6.877E-01 | 3.849E-01 | 1.322E-02 | 2.151E-01 | 2.890E-01 |
| a8 | -2.003E+00 | -1.166E+00 | 3.015E-01 | 9.489E-02 | -1.665E-01 | -1.276E-01 |
| a10 | 3.454E+00 | 2.044E+00 | -3.367E-01 | -6.693E-02 | -1.703E-02 | 8.467E-03 |
| a12 | 0.000E+00 | 0.000E+00 | 0.000E+00 | 0.000E+00 | 4.891E-02 | 2.022E-02 |
| a14 | 0.000E+00 | 0.000E+00 | 0.000E+00 | 0.000E+00 | 3.030E-02 | -2.550E-04 |
| a16 | 0.000E+00 | 0.000E+00 | 0.000E+00 | 0.000E+00 | -2.819E-02 | -3.127E-03 |

| \multicolumn{6}{l}{system focal length =2.007mm, half field-of-view =70.000°, F-number =2.401, system length=4.301mm} | | | | | |
|---|---|---|---|---|---|
| lens element | surface | radius of curvature | thickness | refractive index | Abbe number | focal length |
| object | | ∞ | ∞ | | | |
| | | ∞ | 0.200 | | | |
| first lens element 3 | object-side surface 31 | 11.896 | 0.386 | 1.535 | 55.712 | 22.162 |
| | image-side surface 32 | 2.548 | 0.109 | | | |
| second lens element 4 | object-side surface 41 | 0.980 | 0.317 | 1.640 | 23.529 | -6.005 |
| | image-side surface 42 | 0.683 | 0.376 | | | |
| third lens element 5 | object-side surface 51 | 2.927 | 0.349 | 1.544 | 56.114 | 2.401 |
| | image-side surface 52 | -2.274 | -0.019 | | | |
| aperture stop 2 | | ∞ | 0.115 | | | |
| fourth lens element 6 | object-side surface 61 | 3.182 | 0.660 | 1.544 | 56.114 | 1.400 |
| | image-side surface 62 | -0.932 | 0.181 | | | |
| fifth lens element 7 | object-side surface 71 | -4.279 | 0.297 | 1.640 | 23.529 | -2.309 |
| | image-side surface 72 | 2.345 | 0.171 | | | |
| sixth lens element 8 | object-side surface 81 | 25.580 | 0.436 | 1.531 | 55.744 | -11.593 |
| | image-side surface 82 | 4.946 | 0.200 | | | |
| optical filter 9 | object-side surface 91 | ∞ | 0.210 | | | |
| | image-side surface 92 | ∞ | 0.513 | | | |
| image plane 100 | | ∞ | | | | |

| surface | 31 | 32 | 41 | 42 | 51 | 52 |
|---|---|---|---|---|---|---|
| K | | 0.000E+00 | 0.000E+00 | 0.000E+00 | 0.000E+00 | 0.000E+00 |
| a4 | | 5.025E-02 | -2.300E-01 | -3.996E-01 | -2.628E-01 | -3.160E-01 |
| a6 | spherical | 1.150E-01 | -2.599E-01 | -1.016E+00 | -6.388E-01 | -5.547E-01 |
| a8 | | 0.000E+00 | 0.000E+00 | 0.000E+00 | -5.449E-01 | 4.574E-01 |
| a10 | | 0.000E+00 | 0.000E+00 | 0.000E+00 | 0.000E+00 | 0.000E+00 |
| a12 | | 0.000E+00 | 0.000E+00 | 0.000E+00 | 0.000E+00 | 0.000E+00 |
| a14 | | 0.000E+00 | 0.000E+00 | 0.000E+00 | 0.000E+00 | 0.000E+00 |
| a16 | | 0.000E+00 | 0.000E+00 | 0.000E+00 | 0.000E+00 | 0.000E+00 |

| surface | 61 | 62 | 71 | 72 | 81 | 82 |
|---|---|---|---|---|---|---|
| K | 0.000E+00 | 0.000E+00 | 0.000E+00 | 0.000E+00 | 0.000E+00 | 0.000E+00 |
| a4 | -7.284E-02 | 2.634E-01 | -2.025E-01 | -1.145E-01 | 1.729E-02 | -1.994E-01 |
| a6 | 6.744E-01 | 3.038E-01 | 1.142E-01 | -4.821E-02 | 3.174E-03 | 3.475E-02 |
| a8 | -2.993E-01 | -1.790E+00 | -1.544E+00 | 2.443E-03 | 6.802E-03 | 1.943E-02 |
| a10 | 7.701E-01 | 2.045E+00 | 9.996E-01 | 1.220E-02 | -1.103E-02 | -7.663E-04 |
| a12 | 0.000E+00 | 0.000E+00 | 0.000E+00 | 0.000E+00 | -8.639E-04 | -2.688E-03 |
| a14 | 0.000E+00 | 0.000E+00 | 0.000E+00 | 0.000E+00 | -2.369E-02 | -1.871E-03 |
| a16 | 0.000E+00 | 0.000E+00 | 0.000E+00 | 0.000E+00 | 1.442E-02 | 8.072E-04 |

FIG. 8 system focal length =1.907mm, half field-of-view =70.000°, F-number =2.400, system length=4.300mm

| lens element | surface | radius of curvature | thickness | refractive index | Abbe number | focal length |
|---|---|---|---|---|---|---|
| object | | ∞ | ∞ | | | |
| | | ∞ | 0.200 | | | |
| first lens element 3 | object-side surface 31 | 12.462 | 0.385 | 1.535 | 55.712 | -6.060 |
| | image-side surface 32 | 2.552 | 0.108 | | | |
| second lens element 4 | object-side surface 41 | 0.997 | 0.315 | 1.640 | 23.529 | -5.504 |
| | image-side surface 42 | 0.682 | 0.414 | | | |
| third lens element 5 | object-side surface 51 | 2.336 | 0.361 | 1.544 | 56.114 | 2.414 |
| | image-side surface 52 | -2.857 | 0.052 | | | |
| aperture stop 2 | | ∞ | 0.115 | | | |
| fourth lens element 6 | object-side surface 61 | 3.265 | 0.571 | 1.544 | 56.114 | 1.360 |
| | image-side surface 62 | -0.902 | 0.140 | | | |
| fifth lens element 7 | object-side surface 71 | -16.717 | 0.296 | 1.640 | 23.529 | -2.343 |
| | image-side surface 72 | 1.672 | 0.186 | | | |
| sixth lens element 8 | object-side surface 81 | 11.431 | 0.432 | 1.531 | 55.744 | -13.005 |
| | image-side surface 82 | 4.258 | 0.200 | | | |
| optical filter 9 | object-side surface 91 | ∞ | 0.210 | | | |
| | image-side surface 92 | ∞ | 0.515 | | | |
| image plane 100 | | ∞ | | | | |

FIG. 11

| surface | 31 | 32 | 41 | 42 | 51 | 52 |
|---|---|---|---|---|---|---|
| K | | 0.000E+00 | 0.000E+00 | 0.000E+00 | 0.000E+00 | 0.000E+00 |
| a4 | | 1.119E-01 | -1.760E-01 | -4.785E-01 | -2.964E-01 | -3.565E-01 |
| a6 | spherical | 9.813E-02 | -1.772E-01 | -7.287E-01 | -6.121E-01 | -3.197E-01 |
| a8 | | 0.000E+00 | 0.000E+00 | 0.000E+00 | 3.600E-01 | 4.695E-01 |
| a10 | | 0.000E+00 | 0.000E+00 | 0.000E+00 | 0.000E+00 | 0.000E+00 |
| a12 | | 0.000E+00 | 0.000E+00 | 0.000E+00 | 0.000E+00 | 0.000E+00 |
| a14 | | 0.000E+00 | 0.000E+00 | 0.000E+00 | 0.000E+00 | 0.000E+00 |
| a16 | | 0.000E+00 | 0.000E+00 | 0.000E+00 | 0.000E+00 | 0.000E+00 |

| surface | 61 | 62 | 71 | 72 | 81 | 82 |
|---|---|---|---|---|---|---|
| K | 0.000E+00 | 0.000E+00 | 0.000E+00 | 0.000E+00 | 0.000E+00 | 0.000E+00 |
| a4 | -1.258E-01 | 3.052E-01 | -2.307E-01 | -1.749E-01 | 3.356E-02 | -2.365E-01 |
| a6 | 1.613E-01 | 2.803E-01 | 1.851E-01 | -5.334E-02 | 1.708E-02 | 6.929E-02 |
| a8 | -4.818E-01 | -1.858E+00 | -1.738E+00 | -1.374E-02 | -5.052E-03 | 2.789E-02 |
| a10 | 3.410E-01 | 1.901E+00 | 1.020E+00 | 1.220E-02 | -2.405E-02 | -5.889E-03 |
| a12 | 0.000E+00 | 0.000E+00 | 0.000E+00 | 0.000E+00 | -6.383E-03 | -8.413E-03 |
| a14 | 0.000E+00 | 0.000E+00 | 0.000E+00 | 0.000E+00 | -2.265E-02 | -3.948E-03 |
| a16 | 0.000E+00 | 0.000E+00 | 0.000E+00 | 0.000E+00 | 1.644E-02 | 2.735E-03 |

FIG. 12 system focal length =2.290mm, half field-of-view =70.000°, F-number =2.400, system length=4.352mm

| lens element | surface | radius of curvature | thickness | refractive index | Abbe number | focal length |
|---|---|---|---|---|---|---|
| object | | ∞ | ∞ | | | |
| | | ∞ | 0.150 | | | |
| first lens element 3 | object-side surface 31 | 11.525 | 0.296 | 1.535 | 55.712 | -14.926 |
| | image-side surface 32 | 4.684 | 0.197 | | | |
| second lens element 4 | object-side surface 41 | 1.168 | 0.320 | 1.640 | 23.529 | -4.848 |
| | image-side surface 42 | 0.759 | 0.278 | | | |
| third lens element 5 | object-side surface 51 | 1.877 | 0.466 | 1.544 | 56.114 | 2.389 |
| | image-side surface 52 | -3.899 | 0.078 | | | |
| aperture stop 2 | | ∞ | 0.100 | | | |
| fourth lens element 6 | object-side surface 61 | 1.704 | 0.618 | 1.544 | 56.114 | 1.761 |
| | image-side surface 62 | -1.923 | 0.112 | | | |
| fifth lens element 7 | object-side surface 71 | -6.299 | 0.292 | 1.640 | 23.529 | -2.636 |
| | image-side surface 72 | 2.369 | 0.145 | | | |
| sixth lens element 8 | object-side surface 81 | 4.962 | 0.520 | 1.531 | 55.744 | -25.553 |
| | image-side surface 82 | 3.504 | 0.200 | | | |
| optical filter 9 | object-side surface 91 | ∞ | 0.210 | | | |
| | image-side surface 92 | ∞ | 0.520 | | | |
| image plane 100 | | ∞ | | | | |

FIG. 15

| surface | 31 | 32 | 41 | 42 | 51 | 52 |
|---|---|---|---|---|---|---|
| K |  | 0.000E+00 | 0.000E+00 | 0.000E+00 | 0.000E+00 | 0.000E+00 |
| a4 |  | 7.863E-02 | -4.395E-01 | -9.568E-01 | -2.122E-01 | -3.982E-01 |
| a6 | spherical | 4.793E-02 | -2.741E-02 | -3.407E-01 | -6.291E-01 | -6.846E-03 |
| a8 |  | 5.461E-02 | 1.924E-02 | 5.585E-01 | 1.175E+00 | 6.301E-01 |
| a10 |  | -5.728E-02 | 3.848E-03 | -9.475E-02 | 4.594E-01 | -6.074E-01 |
| a12 |  | 0.000E+00 | 0.000E+00 | 0.000E+00 | 0.000E+00 | 0.000E+00 |
| a14 |  | 0.000E+00 | 0.000E+00 | 0.000E+00 | 0.000E+00 | 0.000E+00 |
| a16 |  | 0.000E+00 | 0.000E+00 | 0.000E+00 | 0.000E+00 | 0.000E+00 |

| surface | 61 | 62 | 71 | 72 | 81 | 82 |
|---|---|---|---|---|---|---|
| K | 0.000E+00 | 0.000E+00 | 0.000E+00 | 0.000E+00 | 0.000E+00 | 0.000E+00 |
| a4 | -2.373E-01 | 2.504E-01 | -2.297E-02 | -4.240E-02 | -4.335E-02 | -2.904E-01 |
| a6 | 5.086E-01 | 4.834E-01 | 1.280E-01 | -1.680E-01 | 6.130E-02 | 1.457E-01 |
| a8 | -9.853E-01 | -2.540E+00 | -1.178E+00 | 1.598E-01 | 4.971E-03 | -1.613E-02 |
| a10 | 1.017E+00 | 2.606E+00 | 1.201E+00 | -3.866E-02 | -6.910E-02 | -1.373E-02 |
| a12 | 0.000E+00 | 0.000E+00 | 0.000E+00 | 0.000E+00 | 3.368E-02 | 1.096E-02 |
| a14 | 0.000E+00 | 0.000E+00 | 0.000E+00 | 0.000E+00 | -8.342E-03 | -9.976E-03 |
| a16 | 0.000E+00 | 0.000E+00 | 0.000E+00 | 0.000E+00 | 3.018E-03 | 2.757E-03 |

FIG. 16 system focal length =2.283mm, half field-of-view =70.000°, F-number =2.400, system length=4.351mm

| lens element | surface | radius of curvature | thickness | refractive index | Abbe number | focal length |
|---|---|---|---|---|---|---|
| object | | ∞ | ∞ | | | |
| | | ∞ | 0.150 | | | |
| first lens element 3 | object-side surface 31 | 11.785 | 0.296 | 1.535 | 55.712 | -16.442 |
| | image-side surface 32 | 5.002 | 0.190 | | | |
| second lens element 4 | object-side surface 41 | 1.175 | 0.334 | 1.640 | 23.529 | -4.931 |
| | image-side surface 42 | 0.762 | 0.279 | | | |
| third lens element 5 | object-side surface 51 | 1.929 | 0.466 | 1.544 | 56.114 | 2.386 |
| | image-side surface 52 | -3.671 | 0.082 | | | |
| aperture stop 2 | | ∞ | 0.100 | | | |
| fourth lens element 6 | object-side surface 61 | 1.749 | 0.631 | 1.544 | 56.114 | 1.767 |
| | image-side surface 62 | -1.878 | 0.100 | | | |
| fifth lens element 7 | object-side surface 71 | -6.357 | 0.294 | 1.640 | 23.529 | -2.601 |
| | image-side surface 72 | 2.318 | 0.127 | | | |
| sixth lens element 8 | object-side surface 81 | 4.532 | 0.521 | 1.531 | 55.744 | -31.246 |
| | image-side surface 82 | 3.420 | 0.200 | | | |
| optical filter 9 | object-side surface 91 | ∞ | 0.210 | | | |
| | image-side surface 92 | ∞ | 0.521 | | | |
| image plane 100 | | ∞ | | | | |

FIG. 19

| surface | 31 | 32 | 41 | 42 | 51 | 52 |
|---|---|---|---|---|---|---|
| K | | 0.000E+00 | 0.000E+00 | 0.000E+00 | 0.000E+00 | 0.000E+00 |
| a4 | | 6.273E-02 | -4.466E-01 | -9.628E-01 | -2.252E-01 | -3.965E-01 |
| a6 | spherical | 4.064E-02 | -2.786E-02 | -3.354E-01 | -6.226E-01 | -6.618E-04 |
| a8 | | 5.718E-02 | 1.932E-02 | 5.885E-01 | 1.175E+00 | 6.413E-01 |
| a10 | | -6.580E-02 | 1.884E-03 | -1.606E-01 | 4.010E-01 | -6.510E-01 |
| a12 | | 0.000E+00 | 0.000E+00 | 0.000E+00 | 0.000E+00 | 0.000E+00 |
| a14 | | 0.000E+00 | 0.000E+00 | 0.000E+00 | 0.000E+00 | 0.000E+00 |
| a16 | | 0.000E+00 | 0.000E+00 | 0.000E+00 | 0.000E+00 | 0.000E+00 |

| surface | 61 | 62 | 71 | 72 | 81 | 82 |
|---|---|---|---|---|---|---|
| K | 0.000E+00 | 0.000E+00 | 0.000E+00 | 0.000E+00 | 0.000E+00 | 0.000E+00 |
| a4 | -2.389E-01 | 2.491E-01 | -1.764E-02 | -4.444E-02 | -3.940E-02 | -2.949E-01 |
| a6 | 5.158E-01 | 4.877E-01 | 1.320E-01 | -1.656E-01 | 5.726E-02 | 1.505E-01 |
| a8 | -9.625E-01 | -2.535E+00 | -1.186E+00 | 1.581E-01 | 3.868E-03 | -1.657E-02 |
| a10 | 9.933E-01 | 2.593E+00 | 1.195E+00 | -4.164E-02 | -6.580E-02 | -1.405E-02 |
| a12 | 0.000E+00 | 0.000E+00 | 0.000E+00 | 0.000E+00 | 3.595E-02 | 1.115E-02 |
| a14 | 0.000E+00 | 0.000E+00 | 0.000E+00 | 0.000E+00 | -1.048E-02 | -9.976E-03 |
| a16 | 0.000E+00 | 0.000E+00 | 0.000E+00 | 0.000E+00 | 3.018E-03 | 2.757E-03 |

FIG. 20 system focal length =2.410mm, half field-of-view =70.080°, F-number =2.400, system length=4.351mm

| lens element | surface | radius of curvature | thickness | refractive index | Abbe number | focal length |
|---|---|---|---|---|---|---|
| object | | ∞ | ∞ | | | |
| | | ∞ | 0.150 | | | |
| first lens element 3 | object-side surface 31 | 12.911 | 0.259 | 1.535 | 55.712 | -40.821 |
| | image-side surface 32 | 8.067 | 0.215 | | | |
| second lens element 4 | object-side surface 41 | 1.298 | 0.278 | 1.640 | 23.529 | -6.082 |
| | image-side surface 42 | 0.893 | 0.396 | | | |
| third lens element 5 | object-side surface 51 | 2.159 | 0.408 | 1.544 | 56.114 | 2.710 |
| | image-side surface 52 | -4.383 | 0.053 | | | |
| aperture stop 2 | | ∞ | 0.100 | | | |
| fourth lens element 6 | object-side surface 61 | 4.165 | 0.527 | 1.544 | 56.114 | 1.809 |
| | image-side surface 62 | -1.237 | 0.099 | | | |
| fifth lens element 7 | object-side surface 71 | 4.900 | 0.299 | 1.640 | 23.529 | -2.749 |
| | image-side surface 72 | 1.270 | 0.256 | | | |
| sixth lens element 8 | object-side surface 81 | 32.107 | 0.542 | 1.531 | 55.744 | -7.577 |
| | image-side surface 82 | 3.565 | 0.200 | | | |
| optical filter 9 | object-side surface 91 | ∞ | 0.210 | | | |
| | image-side surface 92 | ∞ | 0.509 | | | |
| image plane 100 | | | | | | |

FIG. 23

| surface | 31 | 32 | 41 | 42 | 51 | 52 |
|---|---|---|---|---|---|---|
| K | | 0.000E+00 | 0.000E+00 | 0.000E+00 | 0.000E+00 | 0.000E+00 |
| a4 | | 4.836E-02 | -3.839E-01 | -7.264E-01 | -1.877E-01 | -2.866E-01 |
| a6 | spherical | 1.113E-02 | -5.349E-01 | -8.956E-01 | -7.116E-01 | -5.739E-01 |
| a8 | | -3.496E-02 | 7.233E-01 | 2.056E+00 | 2.574E-01 | 7.110E-01 |
| a10 | | 1.000E-02 | -2.452E-01 | -1.530E+00 | -8.134E-01 | -4.527E-01 |
| a12 | | 0.000E+00 | 0.000E+00 | 0.000E+00 | 0.000E+00 | 0.000E+00 |
| a14 | | 0.000E+00 | 0.000E+00 | 0.000E+00 | 0.000E+00 | 0.000E+00 |
| a16 | | 0.000E+00 | 0.000E+00 | 0.000E+00 | 0.000E+00 | 0.000E+00 |
| surface | 61 | 62 | 71 | 72 | 81 | 82 |
| K | 0.000E+00 | 0.000E+00 | 0.000E+00 | 0.000E+00 | 0.000E+00 | 0.000E+00 |
| a4 | -1.464E-01 | 3.657E-01 | -5.536E-02 | -3.345E-01 | -3.994E-01 | -6.051E-01 |
| a6 | -6.171E-02 | -9.501E-01 | -1.295E+00 | -2.257E-02 | 1.309E+00 | 6.617E-01 |
| a8 | -1.633E-01 | 1.391E+00 | 2.327E+00 | 1.703E-01 | -1.837E+00 | -5.721E-01 |
| a10 | 1.663E+00 | 2.069E-01 | -1.154E+00 | -1.019E-01 | 1.389E+00 | 3.078E-01 |
| a12 | 0.000E+00 | 0.000E+00 | 0.000E+00 | 0.000E+00 | -5.266E-01 | -5.659E-02 |
| a14 | 0.000E+00 | 0.000E+00 | 0.000E+00 | 0.000E+00 | 6.757E-02 | -9.976E-03 |
| a16 | 0.000E+00 | 0.000E+00 | 0.000E+00 | 0.000E+00 | 3.018E-03 | 2.757E-03 |

FIG. 24

| system focal length =2.398mm , half field-of-view =70.000°, F-number =2.400, system length=4.351mm |||||||
|---|---|---|---|---|---|---|
| lens element | surface | radius of curvature | thickness | refractive index | Abbe number | focal length |
| object | | ∞ | ∞ | | | |
| | | ∞ | 0.150 | | | |
| first lens element 3 | object-side surface 31 | 12.595 | 0.258 | 1.535 | 55.712 | -33.340 |
| | image-side surface 32 | 7.340 | 0.198 | | | |
| second lens element 4 | object-side surface 41 | 1.272 | 0.284 | 1.640 | 23.529 | -6.162 |
| | image-side surface 42 | 0.879 | 0.383 | | | |
| third lens element 5 | object-side surface 51 | 2.232 | 0.405 | 1.544 | 56.114 | 2.819 |
| | image-side surface 52 | -4.639 | 0.050 | | | |
| aperture stop 2 | | ∞ | 0.100 | | | |
| fourth lens element 6 | object-side surface 61 | 3.593 | 0.515 | 1.544 | 56.114 | 1.774 |
| | image-side surface 62 | -1.259 | 0.100 | | | |
| fifth lens element 7 | object-side surface 71 | 4.930 | 0.297 | 1.640 | 23.529 | -2.676 |
| | image-side surface 72 | 1.248 | 0.208 | | | |
| sixth lens element 8 | object-side surface 81 | 10.593 | 0.632 | 1.531 | 55.744 | -9.313 |
| | image-side surface 82 | 3.309 | 0.200 | | | |
| optical filter 9 | object-side surface 91 | ∞ | 0.210 | | | |
| | image-side surface 92 | ∞ | 0.511 | | | |
| image plane 100 | | ∞ | | | | |

FIG. 27

| surface | 31 | 32 | 41 | 42 | 51 | 52 |
|---|---|---|---|---|---|---|
| K | 0.000E+00 | 0.000E+00 | 0.000E+00 | 0.000E+00 | 0.000E+00 | 0.000E+00 |
| a4 | -2.080E-01 | 4.402E-02 | -3.797E-01 | -7.183E-01 | -2.133E-01 | -3.584E-01 |
| a6 | -3.468E-02 | 2.159E-02 | -5.505E-01 | -9.824E-01 | -6.553E-01 | -4.555E-01 |
| a8 | -1.388E-01 | -4.802E-02 | 7.407E-01 | 2.278E+00 | 1.358E-01 | 6.324E-01 |
| a10 | 1.803E+00 | 1.515E-02 | -2.543E-01 | -1.768E+00 | -8.272E-01 | -4.688E-01 |
| a12 | 0.000E+00 | 0.000E+00 | 0.000E+00 | 0.000E+00 | 0.000E+00 | 0.000E+00 |
| a14 | 0.000E+00 | 0.000E+00 | 0.000E+00 | 0.000E+00 | 0.000E+00 | 0.000E+00 |
| a16 | 0.000E+00 | 0.000E+00 | 0.000E+00 | 0.000E+00 | 0.000E+00 | 0.000E+00 |

| surface | 61 | 62 | 71 | 72 | 81 | 82 |
|---|---|---|---|---|---|---|
| K | 0.000E+00 | 0.000E+00 | 0.000E+00 | 0.000E+00 | 0.000E+00 | 0.000E+00 |
| a4 | spherical | 2.296E-01 | -1.887E-01 | -3.883E-01 | -3.555E-01 | -5.690E-01 |
| a6 | spherical | -5.784E-01 | -1.044E+00 | 6.523E-02 | 1.309E+00 | 6.209E-01 |
| a8 | spherical | 6.637E-01 | 2.171E+00 | 1.021E-01 | -2.042E+00 | -5.411E-01 |
| a10 | spherical | 9.090E-01 | -1.123E-02 | -8.776E-02 | 1.720E+00 | 2.937E-02 |
| a12 | 0.000E+00 | 0.000E+00 | 0.000E+00 | 0.000E+00 | -7.382E-01 | -5.377E-02 |
| a14 | 0.000E+00 | 0.000E+00 | 0.000E+00 | 0.000E+00 | 1.165E-01 | -9.976E-03 |
| a16 | 0.000E+00 | 0.000E+00 | 0.000E+00 | 0.000E+00 | 3.018E-03 | 2.757E-03 |

FIG. 28

| relationship | first preferred embodiment | second preferred embodiment | third preferred embodiment | fourth preferred embodiment |
|---|---|---|---|---|
| T4/G34 | 3.493 | 6.905 | 3.423 | 3.474 |
| G45/T1 | 0.697 | 0.470 | 0.365 | 0.378 |
| T2/T1 | 0.995 | 0.822 | 0.819 | 1.083 |
| T6/T1 | 1.847 | 1.129 | 1.122 | 1.759 |
| EFL/T1 | 7.958 | 5.203 | 4.957 | 7.747 |
| G56/G23 | 0.351 | 0.456 | 0.450 | 0.521 |
| G45/T2 | 0.700 | 0.572 | 0.445 | 0.349 |
| T4/(G12+G23) | 0.981 | 1.360 | 1.094 | 1.303 |
| G45/(G23+G56) | 0.446 | 0.331 | 0.234 | 0.264 |
| G23/G34 | 2.417 | 3.937 | 2.482 | 1.561 |
| EFL/T2 | 7.998 | 6.329 | 6.050 | 7.156 |
| EFL/G23 | 6.881 | 5.337 | 4.605 | 8.246 |
| T6/(G23+G56) | 1.182 | 0.796 | 0.719 | 1.231 |
| G56/T1 | 0.406 | 0.444 | 0.484 | 0.489 |

FIG. 30

| relationship | Fifth preferred embodiment | sixth preferred embodiment | seventh preferred embodiment |
|---|---|---|---|
| T4/G34 | 3.480 | 3.449 | 3.440 |
| G45/T1 | 0.339 | 0.382 | 0.387 |
| T2/T1 | 1.128 | 1.074 | 1.101 |
| T6/T1 | 1.759 | 2.094 | 2.452 |
| EFL/T1 | 7.737 | 9.306 | 9.303 |
| G56/G23 | 0.457 | 0.648 | 0.543 |
| G45/T2 | 0.300 | 0.356 | 0.351 |
| T4/(G12+G23) | 1.347 | 0.862 | 0.886 |
| G45/(G23+G56) | 0.247 | 0.152 | 0.169 |
| G23/G34 | 1.538 | 2.591 | 2.557 |
| EFL/T2 | 6.861 | 8.666 | 8.452 |
| EFL/G23 | 8.228 | 6.093 | 6.266 |
| T6/(G23+G56) | 1.283 | 0.832 | 1.070 |
| G56/T1 | 0.430 | 0.989 | 0.807 |

FIG. 31

IMAGING LENS, AND ELECTRONIC APPARATUS INCLUDING THE SAME

CROSS-REFERENCE TO RELATED APPLICATION

This application claims priority to Chinese Application No. 201410366292.0, filed on Jul. 29, 2014.

FIELD OF THE INVENTION

The present invention relates to an imaging lens and an electronic apparatus including the same.

BACKGROUND OF THE INVENTION

In recent years, as use of portable electronic devices (e.g., mobile phones and digital cameras) becomes ubiquitous, much effort has been put into reducing dimensions of portable electronic devices. Moreover, as dimensions of charged coupled devices (CCD) and complementary metal-oxide semiconductor (CMOS) based optical sensors are reduced, dimensions of imaging lenses for use with the optical sensors must be correspondingly reduced without significantly compromising optical performance.

Each of U.S. Pat. Nos. 8,355,215, 8,432,619 and Taiwanese. patent publication No. 201337319, discloses a conventional imaging lens that includes six lens elements. However, it is difficult to reduce the system length of such imaging lenses for satisfying requirements of mobile phones with a slim profile.

Therefore, it is required to develop a miniaturized optical imaging lens having reduced dimensions and good imaging quality that may satisfy requirements of miniaturization of consumer electronic products such as mobile phones.

SUMMARY OF THE INVENTION

Therefore, an object of the present invention is to provide an imaging lens having a shorter overall length while maintaining good optical performance.

According to one aspect of the present invention, an imaging lens comprises a first lens element, a second lens element, a third lens element, an aperture stop, a fourth lens element, a fifth lens element and a sixth lens element arranged in order from an object side to an image side along an optical axis of the imaging lens. Each of the first lens element, the second lens element, the third lens element, the fourth lens element, the fifth lens element and the sixth lens element, the refractive power, an object-side surface facing toward the object side, and an image-side surface facing toward the image side.

The object-side surface of the first lens element has a convex portion in a vicinity of a periphery of the first lens element. The object-side surface of the second lens element has a convex portion in a vicinity of the optical axis. The object-side surface of the third lens element has a convex portion in a vicinity of the optical axis, and the image-side surface of the third lens element has a convex portion in a vicinity of the optical axis. The image-side surface of the fourth lens element has a convex portion in a vicinity of the optical axis. The fifth lens element is made of a plastic material. The image-side surface of the sixth lens element has a convex portion in a vicinity of a periphery of the sixth lens element. The imaging lens satisfies T4/G34≥3.4, where T4 represents a thickness of the fourth lens element at the optical axis, and G34 represents an air gap length between the third lens element and the fourth lens element at the optical axis.

The imaging lens does not include any lens element with refractive power other than the first lens element, the second lens element, the third lens element, the fourth lens element, the fifth lens element and the sixth lens element.

Another object of the present invention is to provide an electronic apparatus having an imaging lens with six lens elements.

According to another aspect of the present invention, an electronic apparatus includes a housing and an imaging module. The imaging module is disposed in the housing, and includes the imaging lens of the present invention, a barrel on which the imaging lens is disposed, a holder unit on which the barrel is disposed, and an image sensor disposed at the image side of the imaging lens.

BRIEF DESCRIPTION OF THE DRAWINGS

Other features and advantages of the present invention will become apparent in the following detailed description of the preferred embodiments with reference to the accompanying drawings, of which:

FIG. 3 shows values of some optical parameters corresponding to the imaging lens of the first preferred embodiment;

FIG. 4 shows values of some parameters of an optical relationship corresponding to the imaging lens of the first preferred embodiment;

FIG. 7 shows values of some optical parameters corresponding to the imaging lens of the second preferred embodiment;

FIG. 8 shows values of some parameters of an optical relationship corresponding to the imaging lens of the second preferred embodiment;

FIG. 11 shows values of some optical parameters corresponding to the imaging lens of the third preferred embodiment;

FIG. 12 shows values of some parameters of an optical relationship corresponding to the imaging lens of the third preferred embodiment;

FIG. 15 shows values of some optical parameters corresponding to the imaging lens of the fourth preferred embodiment;

FIG. 16 shows values of some parameters of an optical relationship corresponding to the imaging lens of the fourth preferred embodiment;

FIG. 19 shows values of some optical parameters corresponding to the imaging lens of the fifth preferred embodiment;

FIG. 20 shows values of some parameters of an optical relationship corresponding to the imaging lens of the fifth preferred embodiment;

FIG. 23 shows values of some optical parameters corresponding to the imaging lens of the sixth preferred embodiment;

FIG. 24 shows values of some parameters of an optical relationship corresponding to the imaging lens of the sixth preferred embodiment;

FIG. 27 shows values of some optical parameters corresponding to the imaging lens of the seventh preferred embodiment;

FIG. 28 shows values of some parameters of an optical relationship corresponding to the imaging lens of the seventh preferred embodiment;

FIGS. 30 and 31 are tables each listing values of parameters of other optical relationships corresponding to the imaging lenses of the first to seventh preferred embodiments;

DETAILED DESCRIPTION OF THE PREFERRED EMBODIMENTS

Figure 1:
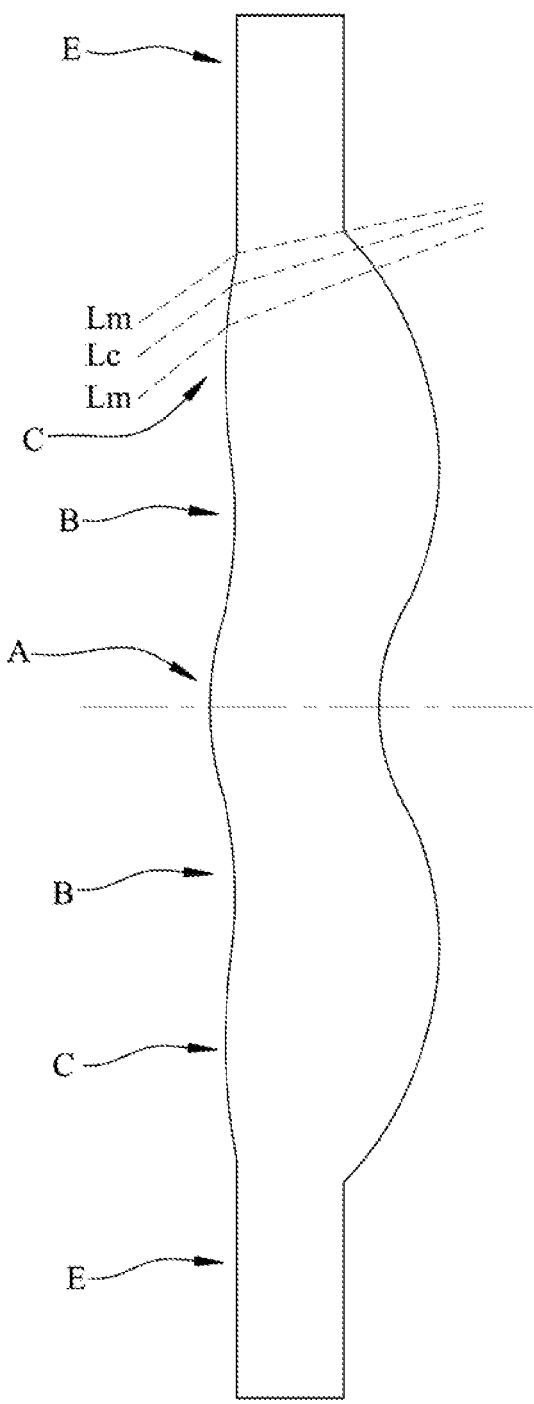
FIG. 1 is a schematic diagram to illustrate the structure of a lens element.

Before the present invention is described in greater detail, it should be noted that like elements are denoted by the same reference numerals throughout the disclosure.

In the following description, "a lens element has a positive (or negative) refractive power" means the lens element has a positive (or negative) refractive power in a vicinity of an optical axis thereof. "An object-side surface (or image-side surface) has a convex (or concave) portion at a certain area" means that, compared to a radially exterior area adjacent to said certain area, said certain area is more convex (or concave) in a direction parallel to the optical axis. Referring to FIG. 1 as an example, the lens element is radially symmetrical with respect to an optical axis (I) thereof. The object-side surface of the lens element has a convex portion at an area A, a concave portion at an area B, and a convex portion at an area C. This is because the area A is more convex in a direction parallel to the optical axis (I) in comparison with a radially exterior area thereof (i.e., area B), the area B is more concave in comparison with the area C, and the area C is more convex in comparison with an area E. "In a vicinity of a periphery" refers to an area around a periphery of a curved surface of the lens element for passage of imaging light only, which is the area C in FIG. 1. The imaging light includes a chief ray Lc and a marginal ray Lm. "In a vicinity of the optical axis" refers to an area around the optical axis of the curved surface for passage of the imaging light only, which is the area A in FIG. 1. In addition, the lens element further includes an extending portion E for installation into an optical imaging lens device. Ideally, the imaging light does not pass through the extending portion E. The structure and shape of the extending portion E are not limited herein. In the following embodiments, the extending portion E is not depicted in the drawings for the sake of clarity.

Figure 2:
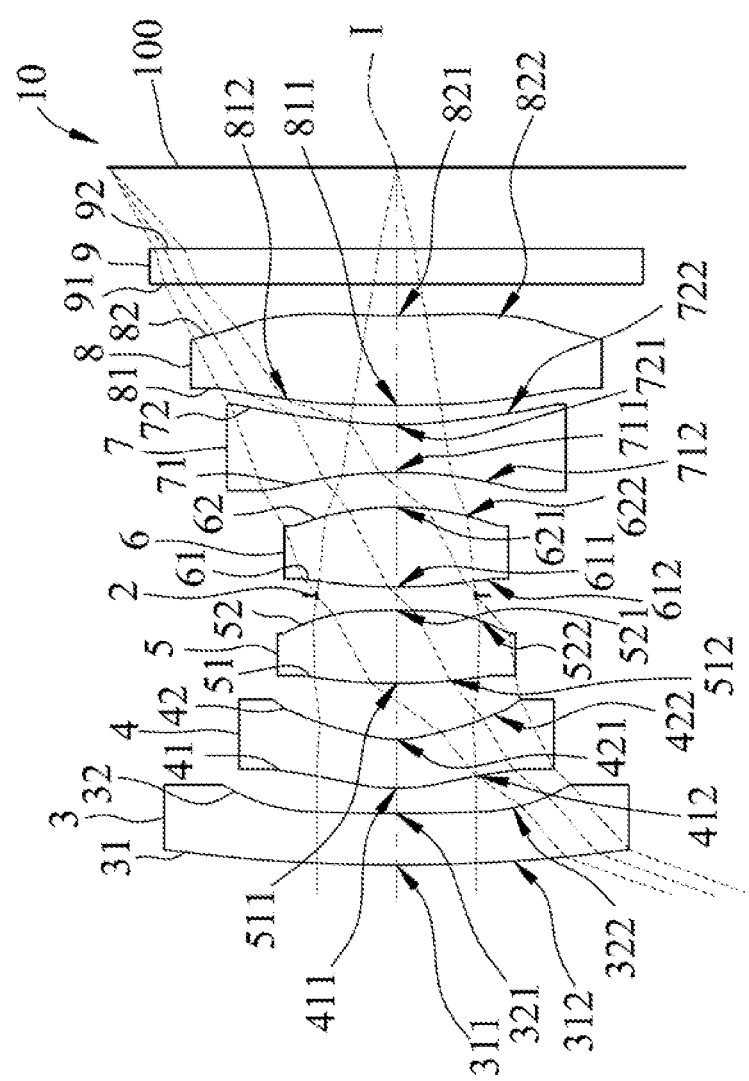
FIG. 2 is a schematic diagram that illustrates the first preferred embodiment of an imaging lens according to the present invention.

Referring to FIG. 2, the first preferred embodiment of an imaging lens 10 according to the present invention includes a first lens element 3, a second lens element 4, a third lens element 5, an aperture stop 2, a fourth lens element 6, a fifth lens elements 7, a sixth lens element 8 and an optical filter 9 arranged in the given order along an optical axis (I) from an object side to an image side. The optical filter 9 is an infrared cut filter for selectively absorbing infrared light to thereby reduce imperfection of images formed at an image plane 100.

Each of the first, second, third, fourth, fifth and sixth lens elements 3-8 and the optical filter 9 has an object-side surface 31, 41, 51, 61, 71, 81, 91 facing toward the object side, and an image-side surface 32, 42, 52, 62, 72, 82, 92 facing toward the image side. Light entering the imaging lens 10 travels through the object-side and image-side surfaces 31, 32 of the first lens element 3, the object-aide and image-side surfaces 41, 42 of the second lens element 4, the object-side and image-side surfaces 51, 52 of the third lens element 5, the aperture stop 2, the object-side and image-side surfaces 61, 62 of the fourth lens element 6, the object-side and image-side surfaces 71, 72 of the fifth lens element 7, the object-side and image-side surfaces 81, 82 of the sixth lens element 8, and the object-side and image-side surfaces 91, 92 of the optical filter 9, in the given order, to form an image on the image plane 100. Each of the object-side surfaces 41, 51, 61, 71, 82 and the image-side surfaces 32, 42, 52, 62, 72, 82 is aspherical and has a center point coinciding with the optical axis (I).

The lens elements 3-8 are made of a plastic material in this embodiment, and at least one of the lens elements 3-8 may be made of other materials in other embodiments. For example, the first, second, third, fourth, and sixth lens elements 3, 4, 5, 6, 8 except for the fourth lens element 7 may be made of other materials.

In the first preferred embodiment, which is depicted in FIG. 2, the first lens element 3 has a positive refractive power. The object-side surface 31 of the first lens element 3 is a convex surface that has a convex portion 311 in a vicinity of the optical axis and a convex portion 312 in a vicinity of a periphery of the first lens element 3. The image-side surface 32 of the first lens element 3 is a concave surface that has a concave portion 321 in a vicinity of the optical axis (I), and a concave portion 322 in a vicinity of the periphery of the first lens element 3.

The second lens element 4 has a negative refractive power. The object-side surface 41 of the second lens element 4 is a convex surface that has a convex portion 411 in a vicinity of the optical axis (I), and a convex portion 412 in a vicinity of a periphery of the second lens element 4. The image-side surface 42 of the second lens element 4 is a concave surface that has a concave portion 421 in a vicinity of the optical axis (I), and a concave portion 422 in a vicinity of the periphery of the second lens element 4.

The third lens element 5 has a positive refractive power. The object-side surface 51 of the third lens element 5 is a convex surface that has a convex portion 511 in a vicinity of the optical axis (I), and a convex portion 512 in a vicinity of a periphery of the third lens element 5. The image-side surface 52 of the third lens element 5 is a convex surface that has a convex portion 521 in a vicinity of the optical axis (I), and a convex portion 522 in a vicinity of the periphery of the third lens element 5.

The fourth lens element 6 has a positive refractive power. The object-side surface 61 of the fourth lens element 6 is a convex surface that has a convex portion 611 in a vicinity of the optical axis (I), and a convex portion 612 in a vicinity of a periphery of the fourth lens element 6. The image-side surface 62 of the fourth lens element 6 is a convex surface that has a convex portion 621 in a vicinity of the optical axis (I), and a convex portion 622 in a vicinity of the periphery of the fourth lens element 6.

The fifth lens element 7 has a negative refractive power. The object-side surface 71 of the fifth lens element 7 is a concave surface that has a concave portion 711 in a vicinity of the optical axis (I), and a concave portion 712 in a vicinity of a periphery of the fifth lens element 7. The image-side surface 72 of the fifth lens element 7 is a concave surface that has a concave portion 721 in a vicinity of the optical axis (I), and a concave portion 722 in a vicinity of the periphery of the fifth lens element 7.

The sixth lens element 8 has a negative refractive power. The object-side surface 81 of the sixth lens element 8 is a convex surface that has a convex portion 811 in a vicinity of the optical axis (I) and a convex portion 812 in a vicinity of the periphery of the sixth lens element 8. The image-side surface 82 of the sixth lens element 8 has a concave portion 821 in a vicinity of the optical axis (I) and a convex portion 822 in a vicinity of a periphery of the sixth lens element 8.

In the first preferred embodiment, the imaging lens 10 does not include any lens element with refractive power other than the aforesaid lens elements 3-8.

Shown in FIG. 3 is a table that lists values of some optical parameters corresponding to the surfaces 31-91, 32-92 of the first preferred embodiment. The imaging lens 10 has an overall system effective focal length (EFL) of 2.378 mm, a half field-of-view (HFOV) of 70.000°, an F-number of 2.401, and a system length of 4.3000 mm. The system length refers to a distance between the object-side surface 31 of the first lens element 3 and the image plane 100 at the optical axis (I).

In this embodiment, the object-side surface 31 of the first lens element 3 is spherical, and each of the object-side surfaces 41-81 and the image-side surfaces 32-82 is aspherical, and satisfies the optical relationship of $$Z(Y) = \frac{Y^2}{R} \bigg/ \left(1 + \sqrt{1 - (1+K)\frac{Y^2}{R^2}}\right) + \sum_{i=1}^{n} \alpha_{2i} \times Y^{2i} \quad (1)$$

where:

Y represents a perpendicular distance between an arbitrary point on an aspherical surface and the optical axis (I);

Z represents a depth of the aspherical surface, which is defined as a perpendicular distance between the arbitrary point on the aspherical surface that is spaced apart from the optical axis (I) by a distance Y, and a tangent plane at a vertex of the aspherical surface at the optical axis (I);

R represents a radius of curvature of the aspherical surface;

K represents a conic constant; and $\alpha_{2i}$ represents a $2i^{th}$ aspherical coefficient.

Shown in FIG. 4 is a table that lists values of some optical parameters of the aforementioned optical relationship (1) corresponding to the first preferred embodiment. Note that in FIG. 4, the column under "32" represents aspherical coefficients of the image-side surface 32 of the first lens element 3 and the values listed in the ether columns correspond to other surfaces of the lens elements 4-8.

Relationships among some of the aforementioned optical parameters corresponding to the first preferred embodiment are shown in FIG. 30, where:

T1 represents a thickness of the first lens element 3 at the optical axis (I);

T2 represents a thickness of the second lens element 4 at the optical axis (I);

T3 represents a thickness of the third lens element 5 at the optical axis (I);

T4 represents a thickness of the fourth lens element 6 at the optical axis (I);

T5 represents a thickness of the fifth lens element 7 at the optical axis (I);

T6 represents a thickness of the sixth lens element 8 at the optical axis (I);

G12 represents an air gap length between the first lens element 3 and the second lens element 4 at the optical axis (I);

G23 represents an air gap length between the second lens element 4 and the third lens element 5 at the optical axis (I);

G34 represents an air gap length between the third lens element 5 and the fourth lens element 6 at the optical axis (I);

G45 represents an air gap length between the fourth lens element 6 and the fifth lens element 7 at the optical axis (I);

G56 represents an air gap length between the fifth lens element 7 and the sixth lens element 8 at the optical axis (I);

Gaa represents a sum of air gap lengths among the first lens element 3, the second lens element 4, the third lens element 5, the fourth lens element 6, the fifth lens element 7, and the sixth lens element 8 at the optical axis (I), i.e., a sum of G12, G23, G34, G45 and G56;

ALT represents a sum of the thicknesses of the first lens element 3, the second lens element 4, the third lens element 5, the fourth lens element 6, the fifth lens element 7 and the sixth lens element 8 at the optical axis (I), i.e., a sum of T1, T2, 13, T4, T5 and T6;

TTL represents a distance at the optical axis (I) between the object-side surface 31 of the first lens element 3 and the image plane 100 at the image side;

BFL represents a distance at the optical axis (I) between the image-side surface 82 of the sixth lens element 8 and the image plane 100; and EFL represents a system length of the imaging lens 10.

FIGS. 5(a) to 5(d) respectively show simulation results corresponding to longitudinal spherical aberration, sagittal astigmatism aberration, tangential astigmatism aberration, and distortion aberration of the first preferred embodiment. In each of the simulation results, curves corresponding respectively to wavelengths of 470 nm, 555 nm, and 650 nm are shown.

Figure 5:
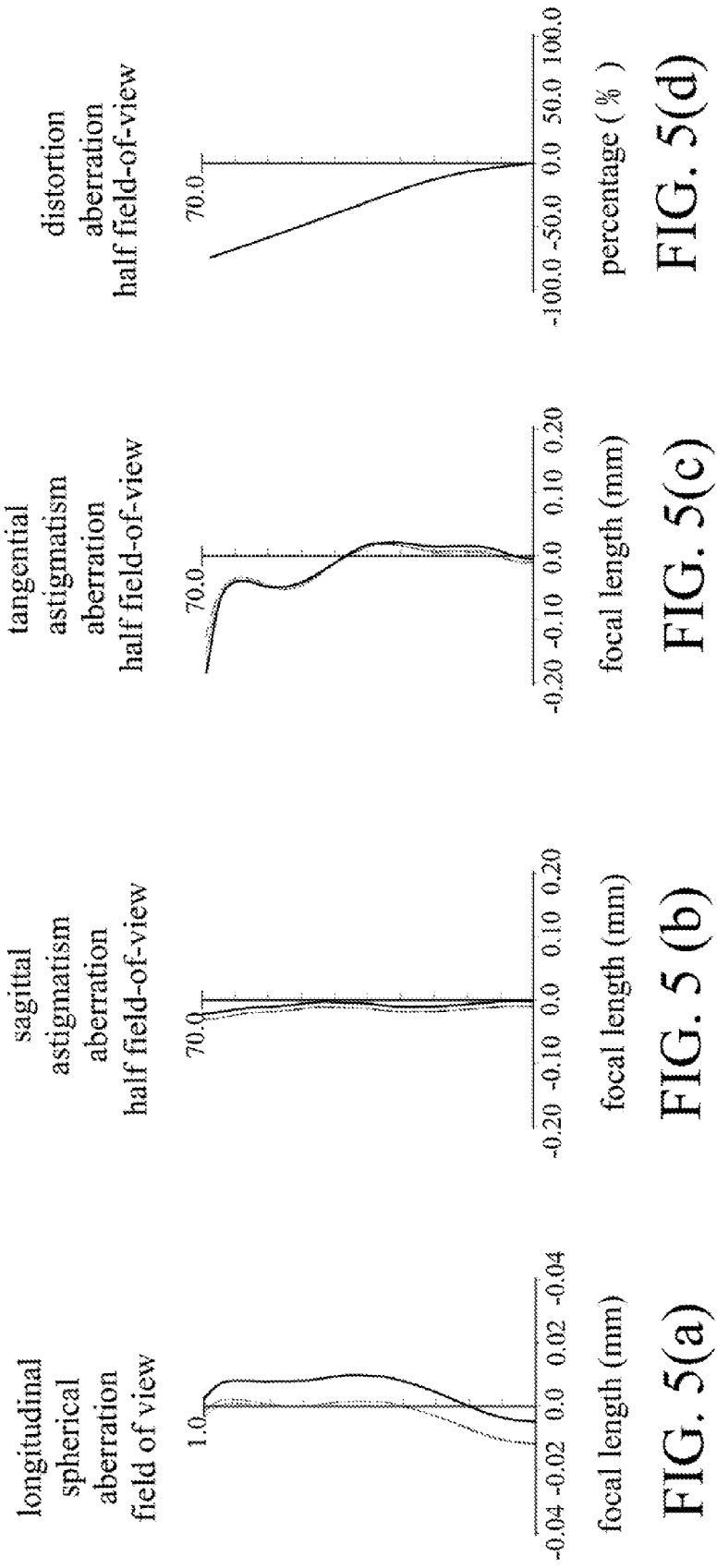
FIGS. 5(a) to 5(d) show different optical characteristics of the imaging lens of the first preferred embodiment.

It can be understood from FIG. 5(a) that, since each of the curves corresponding to longitudinal spherical aberration has a focal length at each field of view (indicated by the vertical axis) that falls within the range of ±0.02 mm, the first preferred embodiment is able to achieve a relatively low spherical aberration at each of the wavelengths. Furthermore, since the curves at each field of view are close to each other, the first preferred embodiment has a relatively low chromatic aberration.

It can be understood from FIGS. 5(b) and 5(c) that, since each of the curves falls within the range of ±0.2 mm of focal length, the first preferred embodiment has a relatively low optical aberration.

Moreover, as shown in FIG. 5(d), since each of the curves corresponding to distortion aberration falls within the range of ±80%, the first preferred embodiment is able to meet requirements in imaging quality of most optical systems.

In view of the above, even with the system length reduced down to 4.3 mm, the imaging lens 10 of the first preferred embodiment is still able to achieve a relatively good optical performance.

Figure 6:
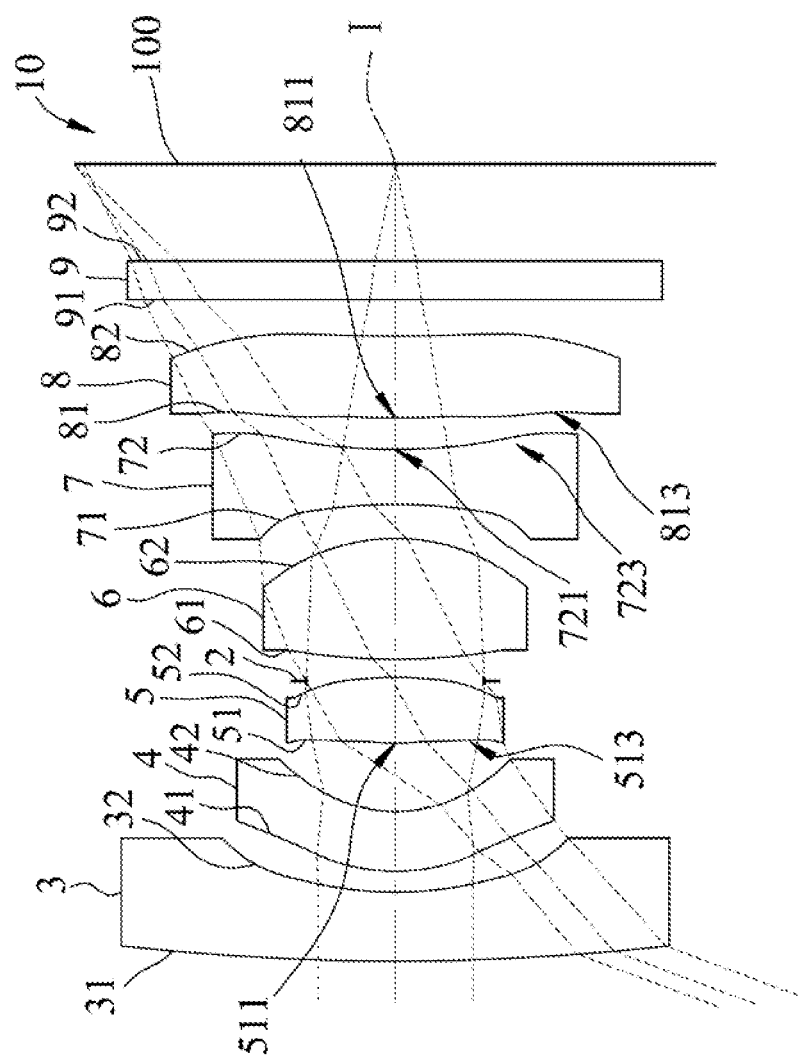
FIG. 6 is a schematic diagram that illustrates the second preferred embodiment of an imaging lens according to the present invention.
Figures 9A, 9B, 9C, 9D:
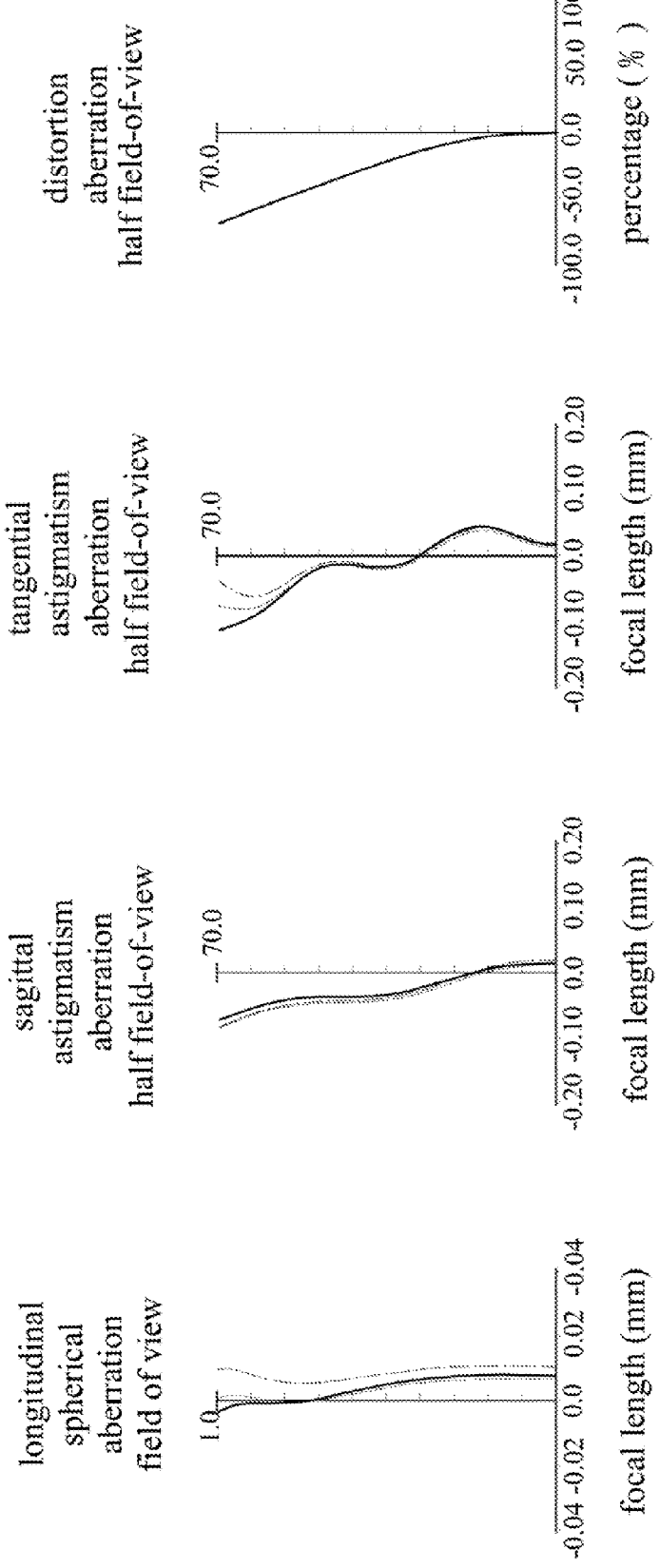
FIGS. 9(a) to 9(d) show different optical characteristics of the imaging lens of the second preferred embodiment.

Referring to FIG. 6, the differences between the first and second preferred embodiments of the imaging lens 10 of this invention reside in the following.—The object-side surface 51 of the third lens element 5 has a convex portion 511 in a vicinity of the optical axis (I) and a concave portion 513 in a vicinity of the periphery of the third lens element 5. The image-side surface 72 of the fifth lens element 7 has a concave portion 721 in a vicinity of the optical axis (I) and a convex portion 723 in a vicinity of the periphery of the fifth lens element 7. The object-side surface 81 of the sixth lens element 8 has a convex portion 811 in a vicinity of the optical axis (I) and a concave portion 813 in a vicinity of the periphery of the sixth lens element 8. It should be noted that the reference numerals of the concave portions and the convex portions in the second embodiment that are the same as those found in the first embodiment are omitted in the drawings herein for the sake of clarity.

Shown in FIG. 7 is a table that lists values of some optical parameters corresponding to the surfaces 31-91, 32-92 of the second preferred embodiment. The imaging lens 10 has an overall system focal length of 2.007 mm, an HFOV of 70.000°, an F-number of 2.401, and a system length of 4.301 mm.

Shown in FIG. 8 is a table that lists values of some optical parameters of the aforementioned optical relationship (1) corresponding to the second preferred embodiment.

Relationships among some of the aforementioned optical parameters corresponding to the second preferred embodiment are shown in FIG. 30.

FIGS. 9(a) to 9(d) respectively show simulation results corresponding to longitudinal spherical aberration, sagittal astigmatism aberration, tangential astigmatism aberration, and distortion aberration of the second preferred embodiment, it can be understood from FIGS. 9(a) to 9(d) that the second preferred embodiment is able to achieve a relatively good optical performance. Moreover, it can be appreciated that the optical performance of the second preferred embodiment is better than that of the first preferred embodiment. Additionally, manufacture of the second embodiment is relatively easier as compared to the first embodiment, such that yield rate of the second preferred embodiment may be greater than that of the first preferred embodiment.

Figure 10:
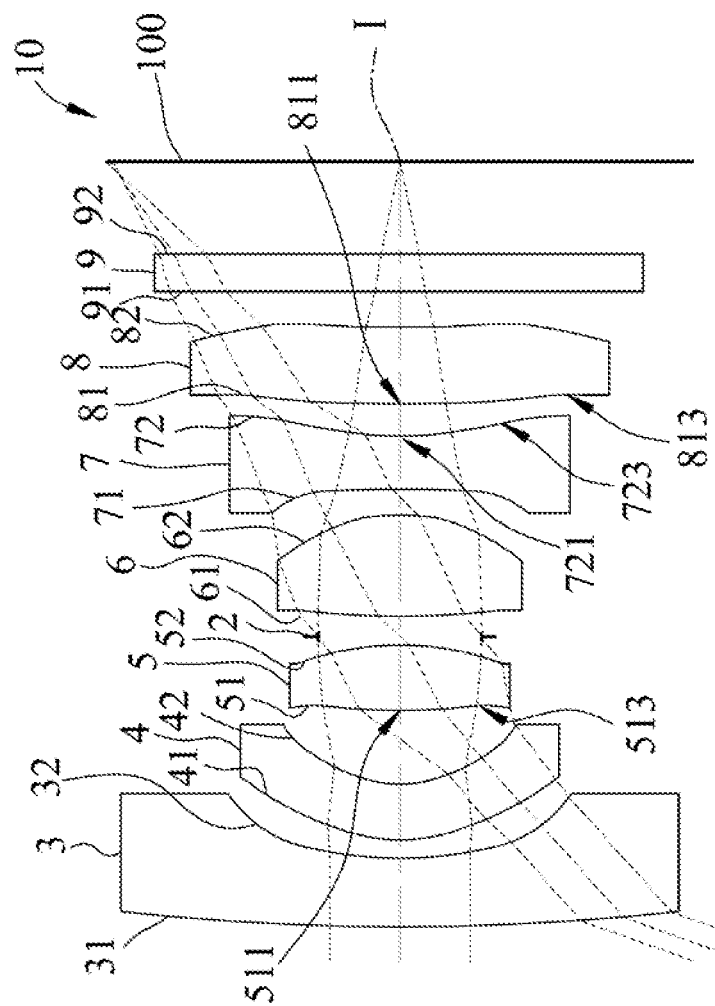
FIG. 10 is a schematic diagram that illustrates the third preferred embodiment of an imaging lens according to the present invention.
Figures 13A, 13B, 13C, 13D:
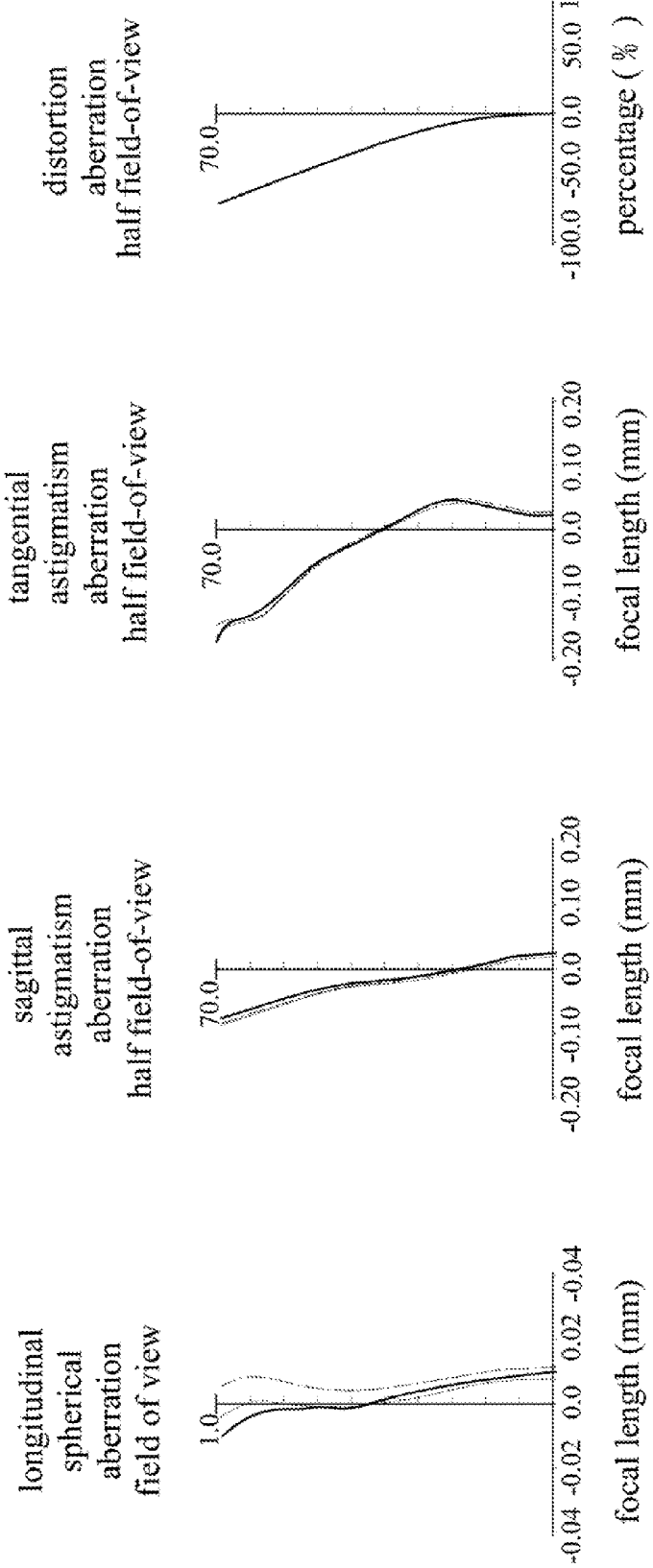
FIGS. 13(a) to 13(d) show different optical characteristics of the imaging lens of the third preferred embodiment.

Referring to FIG. 10, the differences between the first and third preferred embodiments of the imaging lens 10 of this invention reside in the following. The first lens element 3 has a negative refractive power. The object-side surface 51 of the third lens element 5 has a convex portion 511 in a vicinity of the optical axis (I) and a concave portion 513 in a vicinity of the periphery of the third lens element 5. The image-side surface 72 of the fifth lens element 7 has a concave portion 721 in a vicinity of the optical axis (I) and a convex portion 723 in a vicinity of the periphery of the fifth lens element 7. The object-side surface 81 of the sixth lens element 8 has a convex portion 811 in a vicinity of the optical axis (I) and a concave portion 813 in a vicinity of the periphery of the sixth lens element 8.

Shown in FIG. 11 is a table that lists values of some optical parameters corresponding to the surfaces 31-91, 32-92 of the third preferred embodiment. The imaging lens 10 has an overall system focal length of 1.907 mm, an HFOV of 70.000°, an F-number of 2.400, and a system length of 4.300 mm.

Shown in FIG. 12 is a table that lists values of some optical parameters of the aforementioned optical relationship (1) corresponding to the third preferred embodiment.

Relationships among some of the aforementioned optical parameters corresponding to the third preferred embodiment are shown in FIG. 30.

FIGS. 13(a) to 13(d) respectively show simulation results corresponding to longitudinal spherical aberration, sagittal astigmatism aberration, tangential astigmatism aberration, and distortion aberration of the third preferred embodiment. It can be understood from FIGS. 13(a) to 13(d) that the third preferred embodiment is able to achieve a relatively good optical performance.

It is noted that the optical performance of the third preferred embodiment is better than that of the first preferred embodiment. Additionally, manufacture of the third embodiment is relatively easier as compared to the first embodiment, such that yield rate of the third preferred embodiment may be greater than that of the first preferred embodiment.

Figure 14:
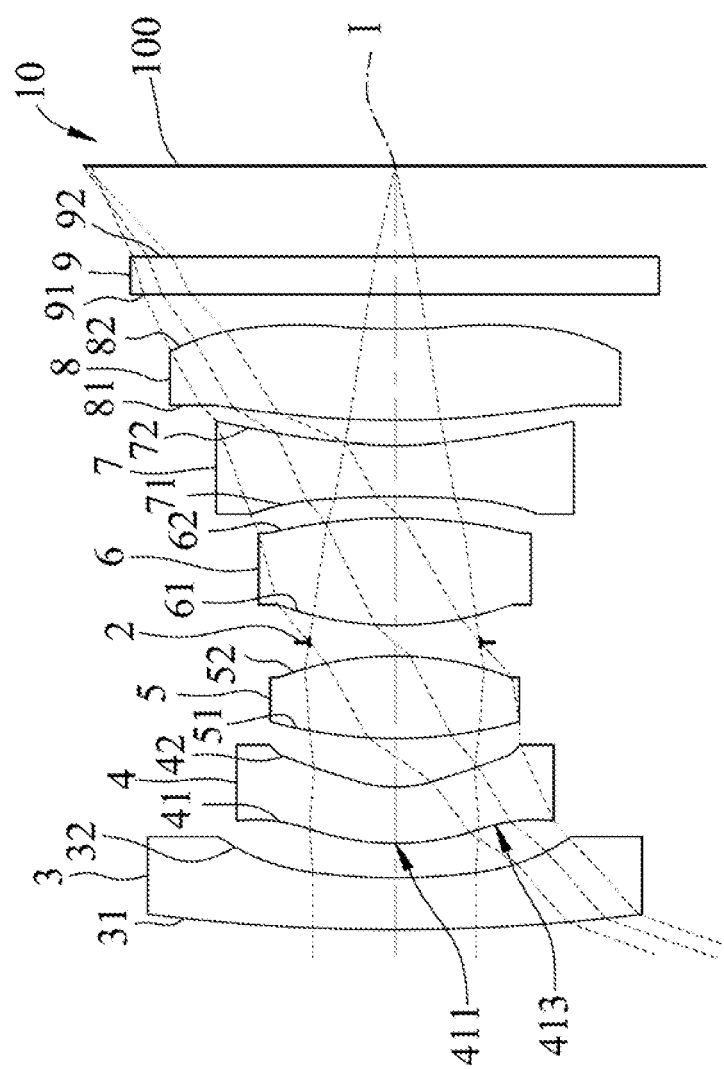
FIG. 14 is a schematic diagram that illustrates the fourth preferred embodiment of an imaging lens according to the present invention.

Referring to FIG. 14, the differences between the first and fourth preferred embodiments of the imaging lens 10 of this invention reside in that: the first lens element 3 has a negative refractive power, and the object-side surface 41 of the second lens element 4 has a convex portion 411 in a vicinity of the optical axis (I) and a concave portion 423 in a vicinity of the periphery of the second lens element 4.

Shown in FIG. 15 is a table that lists values of some optical parameters corresponding to the surfaces 31-91, 32-92 of the fourth preferred embodiment. The imaging lens 10 has an overall system focal length of 2.290 mm, an HFOV of 70.000°, an F-number of 2.400, and a system length of 4.350 mm.

Shown in FIG. 16 is a table that lists values of some optical parameters of the aforementioned optical relationship (1) corresponding to the fourth preferred embodiment.

Relationships among some of the aforementioned optical parameters corresponding to the fourth preferred embodiment are shown in FIG. 30.

Figure 17:
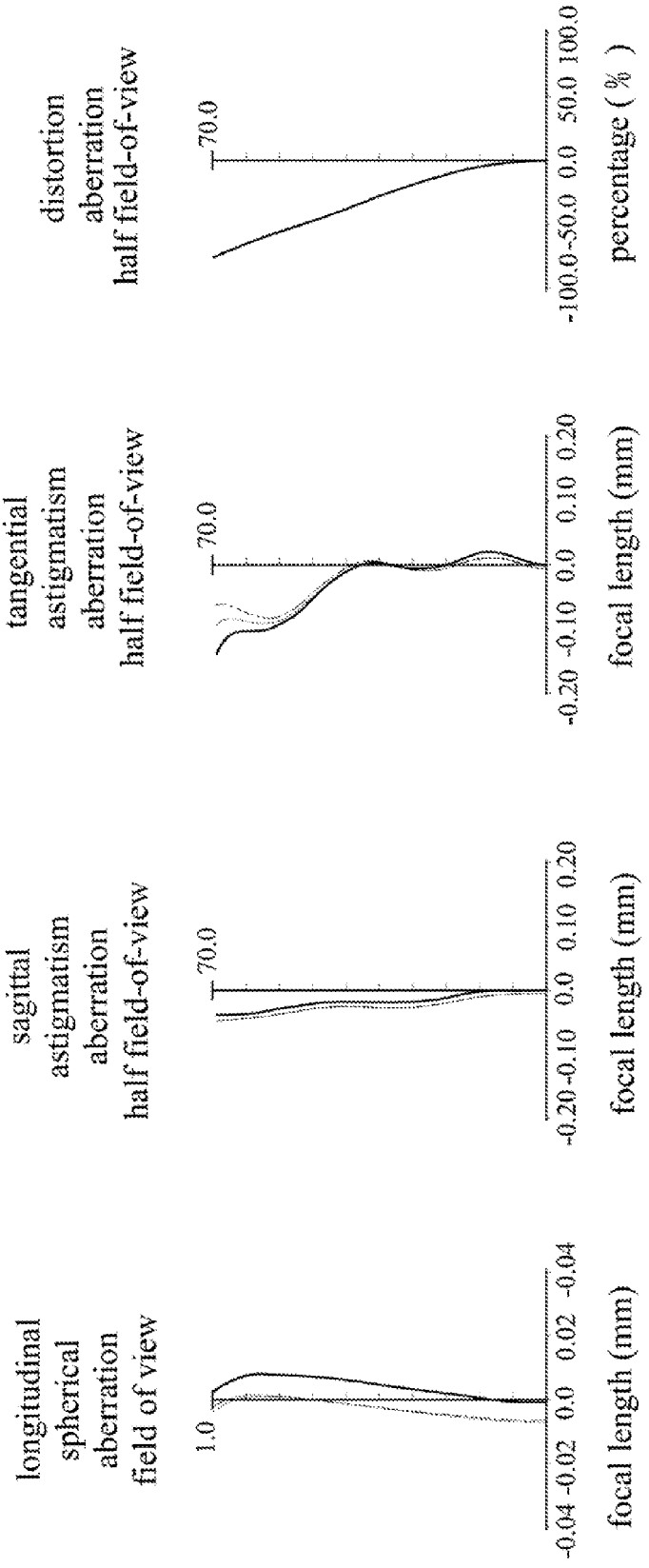
FIGS. 17(a) to 17(d) show different optical characteristics of the imaging lens of the fourth preferred embodiment.

FIGS. 17(a) and 17(d) respectively show simulation results corresponding to longitudinal spherical aberration, sagittal astigmatism aberration, tangential astigmatism aberration, and distortion aberration of the fourth preferred embodiment. It can be understood from FIGS. 17(a) to 17(d) that the fourth preferred embodiment is able to achieve a relatively good optical performance.

It can be appreciated that the optical performance of the fourth preferred embodiment is better than that of the first preferred embodiment. Additionally, manufacture of the fourth embodiment is relatively easier as compared to the first embodiment, such that yield rate of the fourth preferred embodiment may be greater than that of the first preferred embodiment.

Figure 18:
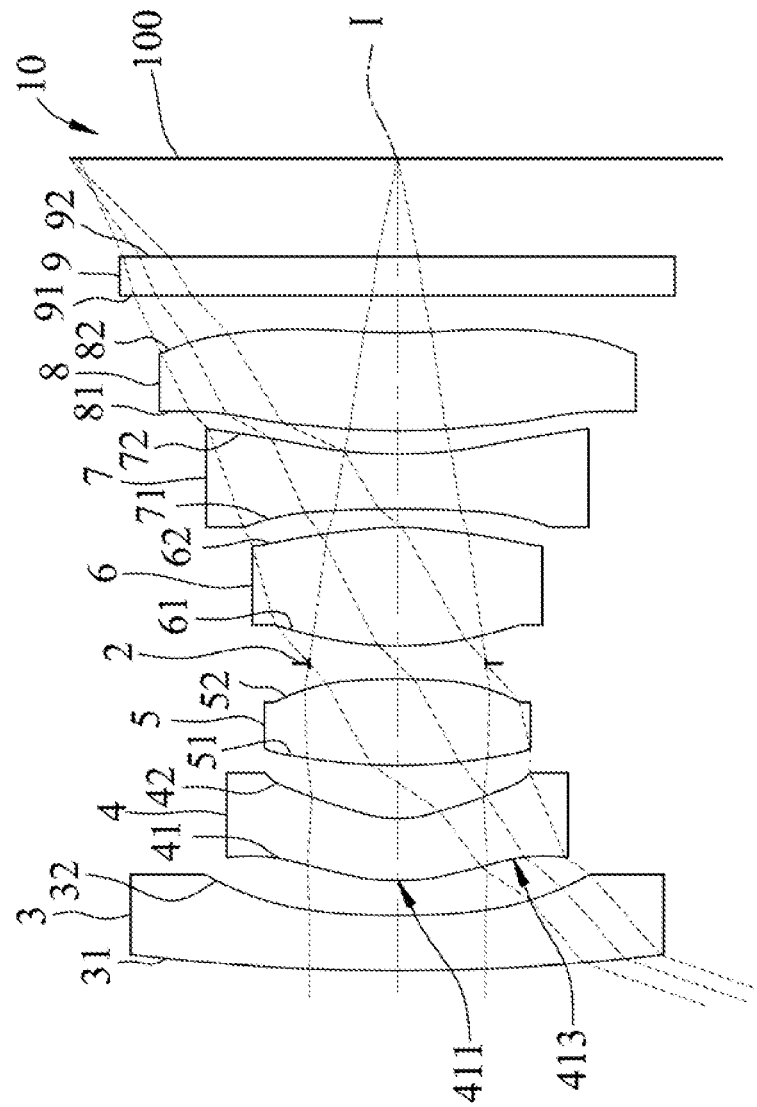
FIG. 18 is a schematic diagram that illustrates the fifth preferred embodiment of an imaging lens according to the present invention.
Figure 21:
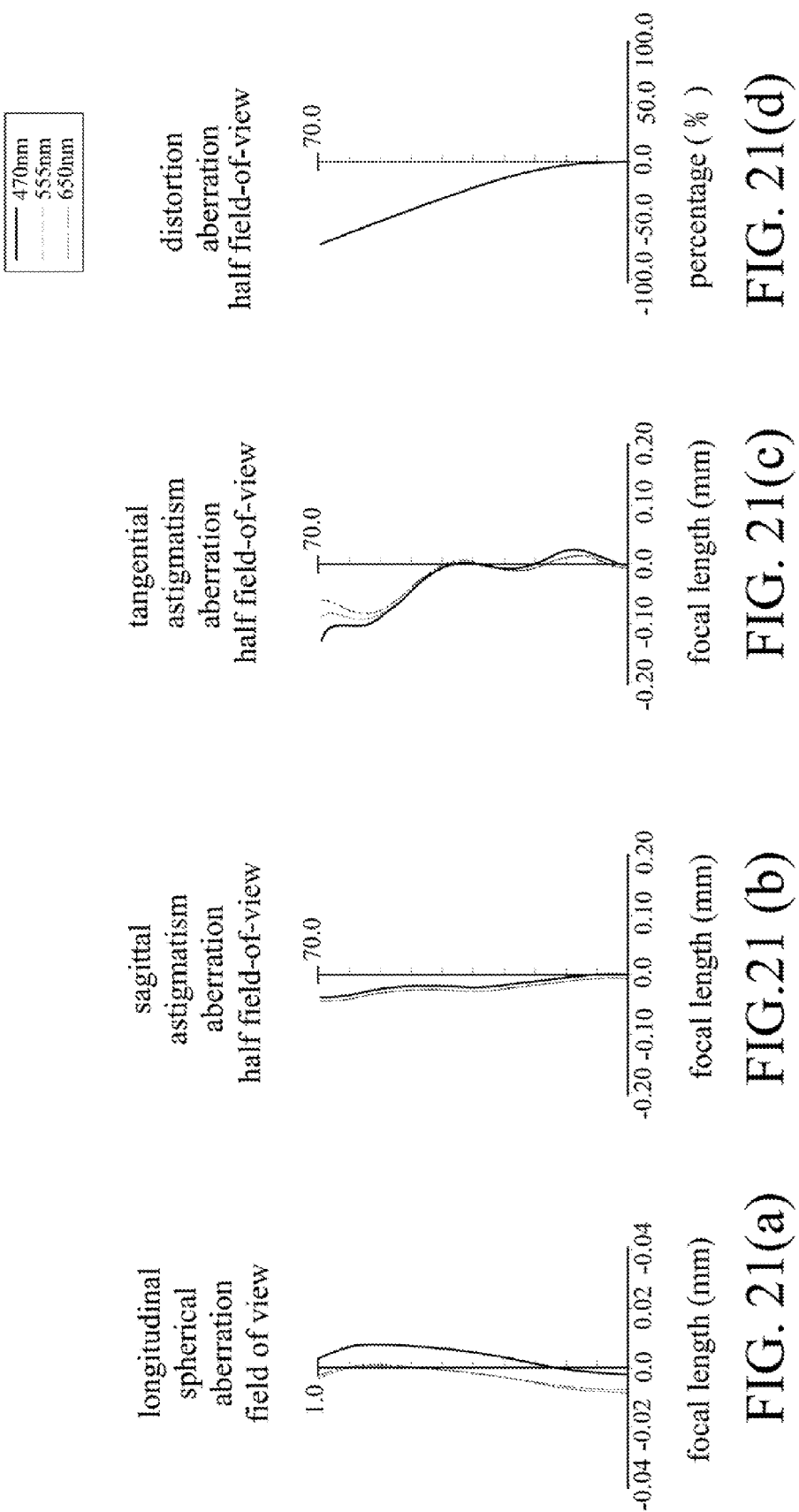
FIGS. 21(a) to 21(d) show different optical characteristics of the imaging lens of the fifth preferred embodiment.

Referring to FIG. 18, the differences between the first and fifth preferred embodiments of the imaging lens 10 of this invention reside in that: the first lens element 3 has a negative refractive power, and the object-side surface 41 of the second lens element 4 has a convex portion 411 in a vicinity of the optical axis (I) and a concave portion 413 in a vicinity of a periphery of the second lens element 4.

Shown in FIG. 19 is a table that lists values of some optical parameters corresponding to the surfaces 31-91, 32-92 of the fifth preferred embodiment. The imaging lens 10 has an overall system focal length of 2.283 mm, an HFOV of 70.000°, an F-number of 2.400, and a system length of 4.350 mm.

Shown in FIG. 20 is a table that lists values of some optical parameters of the aforementioned optical relationship (1) corresponding to the fifth preferred embodiment.

Relationships among some of the aforementioned optical parameters corresponding to the fifth preferred embodiment are shown in FIG. 31.

FIGS. 21(a) to 21(d) respectively show simulation results corresponding to longitudinal spherical aberration, sagittal astigmatism aberration, tangential astigmatism aberration, and distortion aberration of the fifth preferred embodiment. It can be understood from FIGS. 21(a) to 21(d) that the fifth preferred embodiment is able to achieve a relatively good optical performance.

It can be appreciated that the optical performance of the fifth preferred embodiment is better than that of the first preferred embodiment. Additionally, manufacture of the fifth embodiment is relatively easier as compared to the first embodiment, such that yield rate of the fifth preferred embodiment may be greater than that of the first preferred embodiment.

Figure 22:
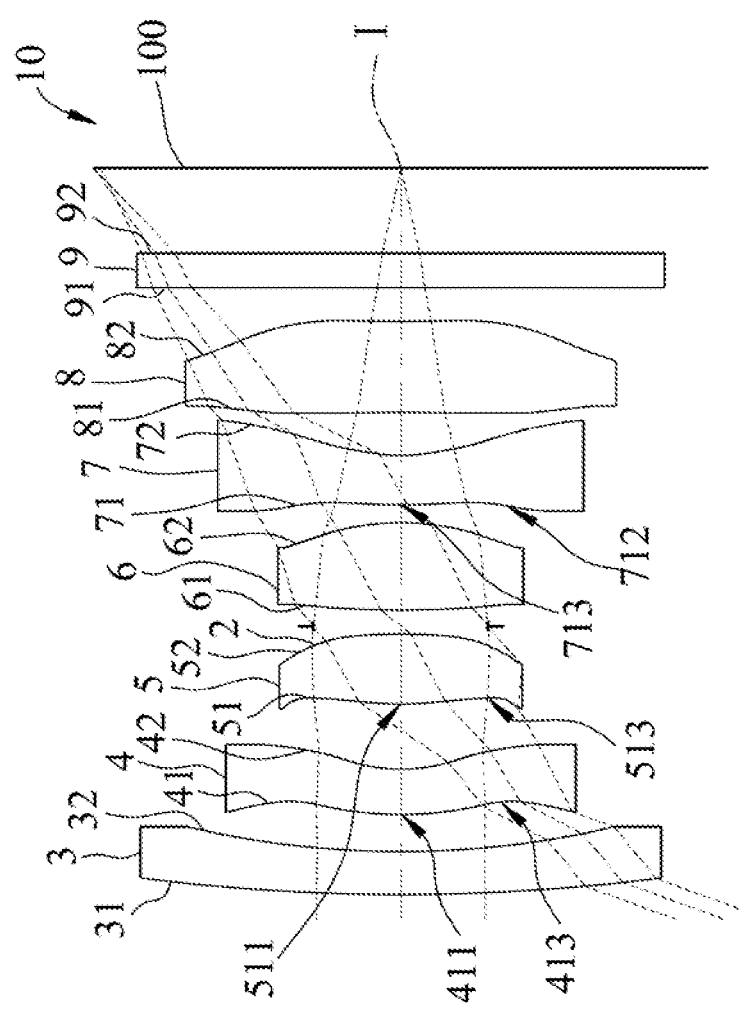
FIG. 22 is a schematic diagram that illustrates the sixth preferred embodiment of an imaging lens according to the present invention.
Figures 25A, 25B, 25C, 25D:
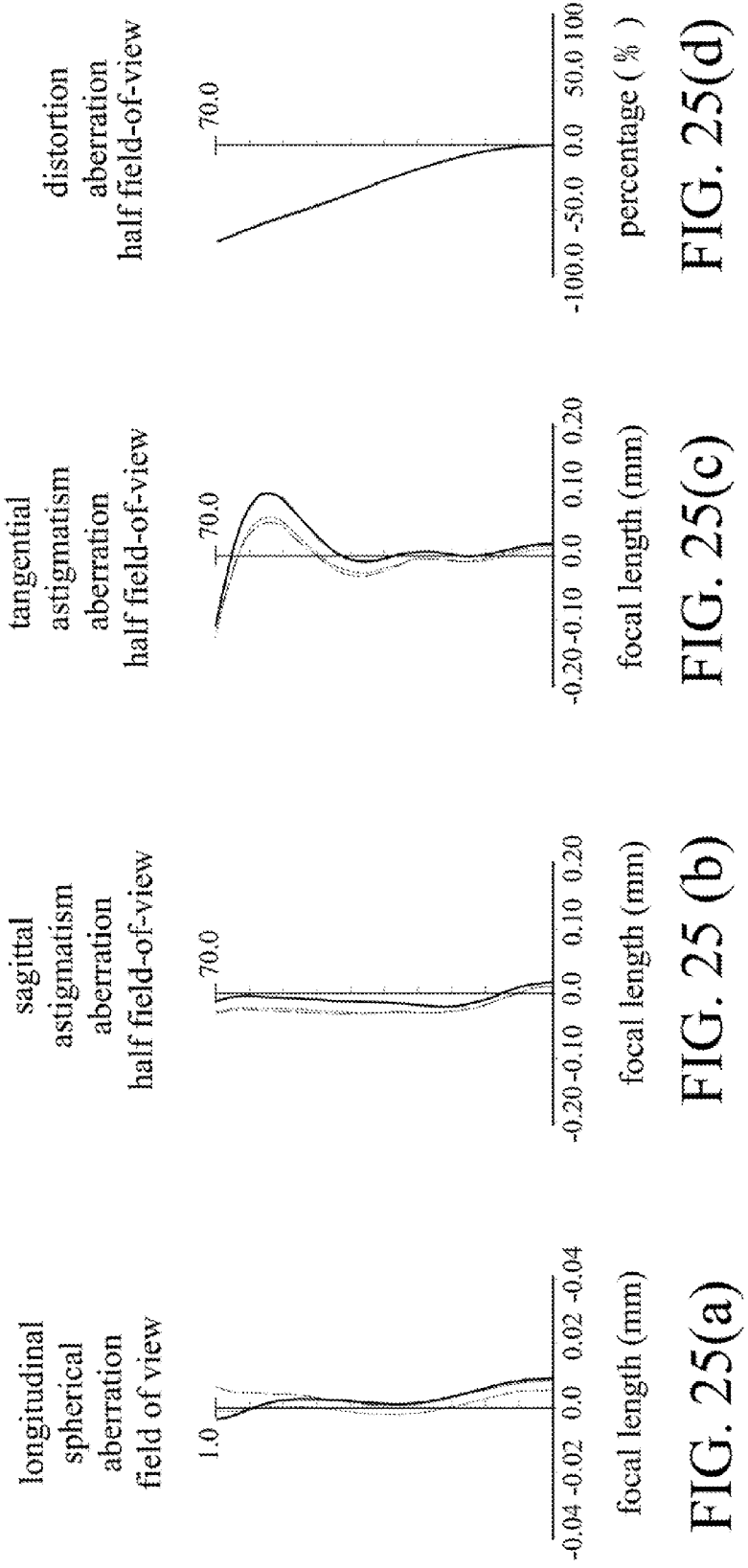
FIGS. 25(a) to 25(d) show different optical characteristics of the imaging lens of the sixth preferred embodiment.

FIG. 22 illustrates the sixth preferred embodiment of an imaging lens 10 according to the present invention, which has a configuration similar to that of the first preferred embodiment. The differences between the first and sixth preferred embodiments reside in that the first lens element 3 has a negative refractive power, the object-side surface 41 of the second lens element 4 has a convex portion 411 in a vicinity of the optical axis (I) and a concave portion 413 in a vicinity of the periphery of the second lens element 4, the object-side surface 51 of the third lens element 5 has a convex portion 511 in a vicinity of the optical axis (I) and a concave portion 513 in a vicinity of the periphery of the third lens element 5, and the object-side surface 71 of the fifth lens element 7 has a convex portion 713 in a vicinity of the optical axis (I) and a concave portion 712 in a vicinity of the periphery of the fifth lens element 7.

Shown in FIG. 23 is a table that lists values of some optical parameters corresponding to the surfaces 31-91, 32-92 of the sixth preferred embodiment. The imaging lens 10 has an overall system focal length of 2.410 mm, an HFOV of 70.000°, an F-number of 2.400, and a system length of 4.350 mm.

Shown in FIG. 24 is a table that lists values of some optical parameters of the aforementioned optical relationship (1) corresponding to the sixth preferred embodiment.

Relationships among some of the aforementioned optical parameters corresponding to the sixth preferred embodiment are shown in FIG. 31.

FIGS. 25(a) to 25(d) respectively show simulation results corresponding to longitudinal spherical aberration, sagittal astigmatism aberration, tangential astigmatism aberration, and distortion aberration of the sixth preferred embodiment. It can be understood from FIGS. 25(a) to 25(d) that the sixth preferred embodiment is able to achieve a relatively good optical performance.

It is noted that the optical performance of the sixth preferred embodiment is better than that of the first preferred embodiment. Additionally, manufacture of the sixth embodiment is relatively easier as compared to the first embodiment, such that yield rate of the fifth preferred embodiment may be greater than that of the first preferred embodiment.

Figure 26:
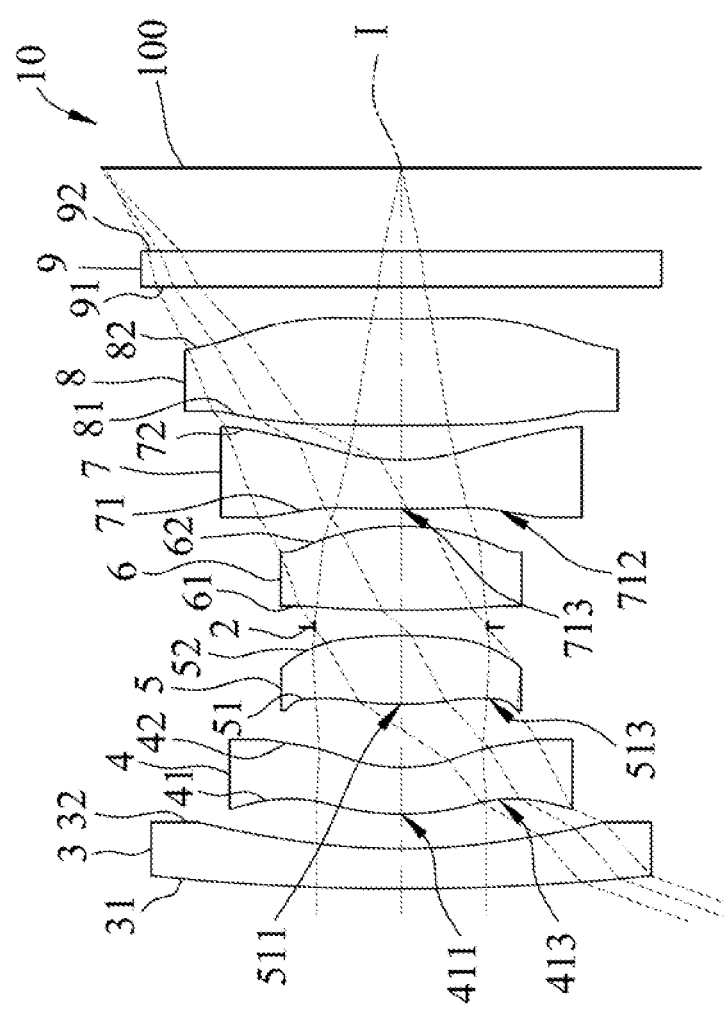
FIG. 26 is a schematic diagram that illustrates the seventh preferred embodiment of an imaging lens according to the present invention.
Figure 29:
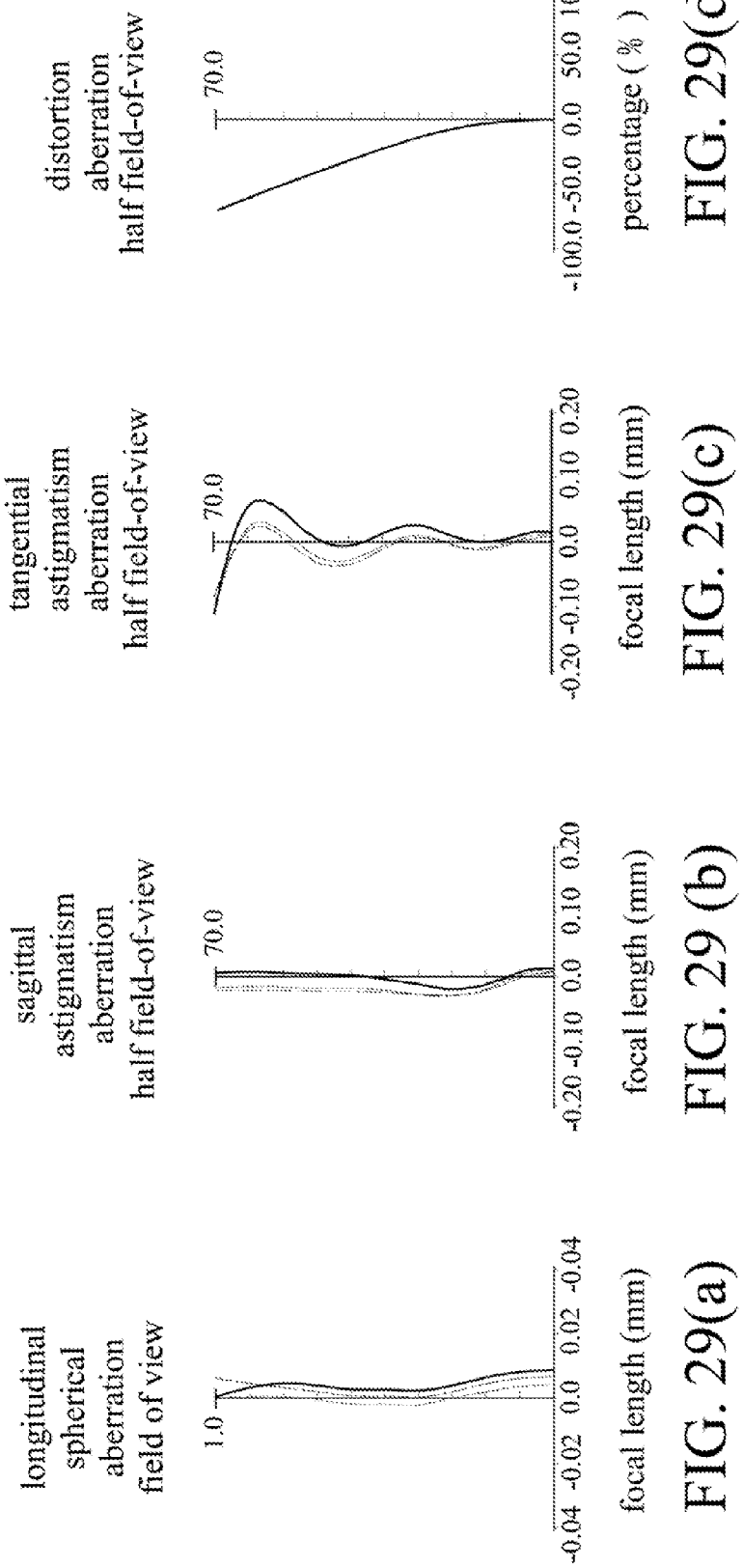
FIGS. 29(a) to 29(d) show different optical characteristics of the imaging lens of the seventh preferred embodiment.

Referring to FIG. 26, the differences between the first and seventh preferred embodiments of the imaging lens 10 of this invention reside in that: the first lens element 3 has a negative refractive power, the object-side surface 41 of the second lens element 4 has a convex portion 411 in a vicinity of the optical axis (I) and a concave portion 413 in a vicinity of the periphery of the second lens element 4, the object-side surface 51 of the third lens element 5 has a convex portion 511 in a vicinity of the optical axis (I) and a concave portion 513 in a vicinity of the periphery of the third lens element 5, and the object-side surface 71 of the fifth lens element 7 has a convex portion 713 in a vicinity of the optical axis (I) and a concave portion 712 in a vicinity of the periphery of the fifth lens element 7.

Shown in FIG. 27 is a table that lists values of some optical parameters corresponding to the surfaces 31-91, 32-92 of the seventh preferred embodiment. The imaging lens 10 has an overall system focal length of 2.398 mm, an HFOV of 70.000°, an F-number of 2.400, and a system length of 4.350 mm.

Shown in FIG. 28 is a table that lists values of some optical parameters of the aforementioned optical relationship (1) corresponding to the seventh preferred embodiment.

Relationships among some of the aforementioned optical parameters corresponding to the seventh preferred embodiment are shown in FIG. 31.

FIGS. 29(a) to 29(d) respectively show simulation results corresponding to longitudinal spherical aberration, sagittal astigmatism aberration, tangential astigmatism aberration, and distortion aberration of the seventh preferred embodiment. It can be understood from FIGS. 29(a) to 29(d) that the seventh preferred embodiment is able to achieve a relatively good optical performance.

It is noted that the optical performance of the seventh preferred embodiment is better than that of the first preferred embodiment. Additionally, manufacture of the seventh embodiment is relatively easier as compared to the first embodiment, such that yield rate of the seventh preferred embodiment may be greater than that of the first preferred embodiment.

Shown in FIGS. 30 and 31 are tables that list relationships among some of the aforementioned optical parameters corresponding to the seven preferred embodiments for comparison. When each of the optical parameters of the imaging lens 10 according to this invention satisfies the following optical relationships, the system length may be reduced while maintaining good optical performance:

(1) $T6/T1 \geq 1.8$; $T6/(G23+G56) \geq 1.0$: Since the sixth lens element 8 having a relatively large effective optical diameter should have a sufficient thickness for ease of manufacture. In addition, reductions in T1, G23, G56 favor reduction in system length of the imaging lens 10. Accordingly, designs of T6/T1 and T6/(G23+G56) tends to be large. However, ratios among T1, G23 and G56 should be designed to be within a proper range to avoid any one of these parameters from being too large, that may result in a long system length of the imaging lens 10, and/or to avoid any one of these parameters from being too small, that may result in difficulty in assembling the imaging lens 10.

(2) $T4/G34 \geq 3.4$; $G45/T1 \geq 0.3$; $T2/T1 \geq 0.92$; $EFL/T1 \geq 4.8$; $G56/G23 \geq 0.3$; $G45/T2 \geq 0.3$; $T4/(G12+G23) \geq 1.3$; $G45/(G23+G56) \geq 0.24$; $G23/G34 \geq 2.4$; $EFL/T2 \geq 5.1$; $EFL/G23 \leq 6.0$; $G56/T1 \geq 0.4$: Under the above listed conditions, ratios among the abovementioned parameters should be proper to avoid any one of these parameters from being too large, that may disfavor in miniaturization of the imaging lens 10, and/or to avoid any one of these parameters from being too small, that may result in difficulty in manufacturing and assembling the imaging lens 10.

Although the design of an optical system is generally associated with unpredictability, satisfaction of the aforementioned relationships may enable the imaging lens 10 to have reductions in the system length and the F-number, to have increase in field of view, to have enhancement of imaging quality, or to have a relatively higher yield rate of assembly, thereby alleviating at least ore drawback of the prior art.

To sum up, effects and advantages of the imaging lens 10 according to the present invention are described hereinafter.

1. By virtue of the convex portion 312, the convex portion 411, the convex portion 511, the convex portion 521, the convex portion 621, and the convex portion 822, optical aberrations may be corrected, thereby ensuring imaging quality of the imaging lens 10.

2. Through design of the relevant optical parameters, optical aberrations, such as spherical aberration, may be reduced or even eliminated. Further, through surface design and arrangement of the lens elements 3-8, even with reduced system length, optical aberrations may still be reduced or even eliminated, resulting in relatively good optical performance.

3. Through the aforesaid seven preferred embodiments, it is known that the system length of this invention may be reduced down to below 4.400 mm, so as to facilitate developing thinner relevant products with economic benefits.

Figure 32:
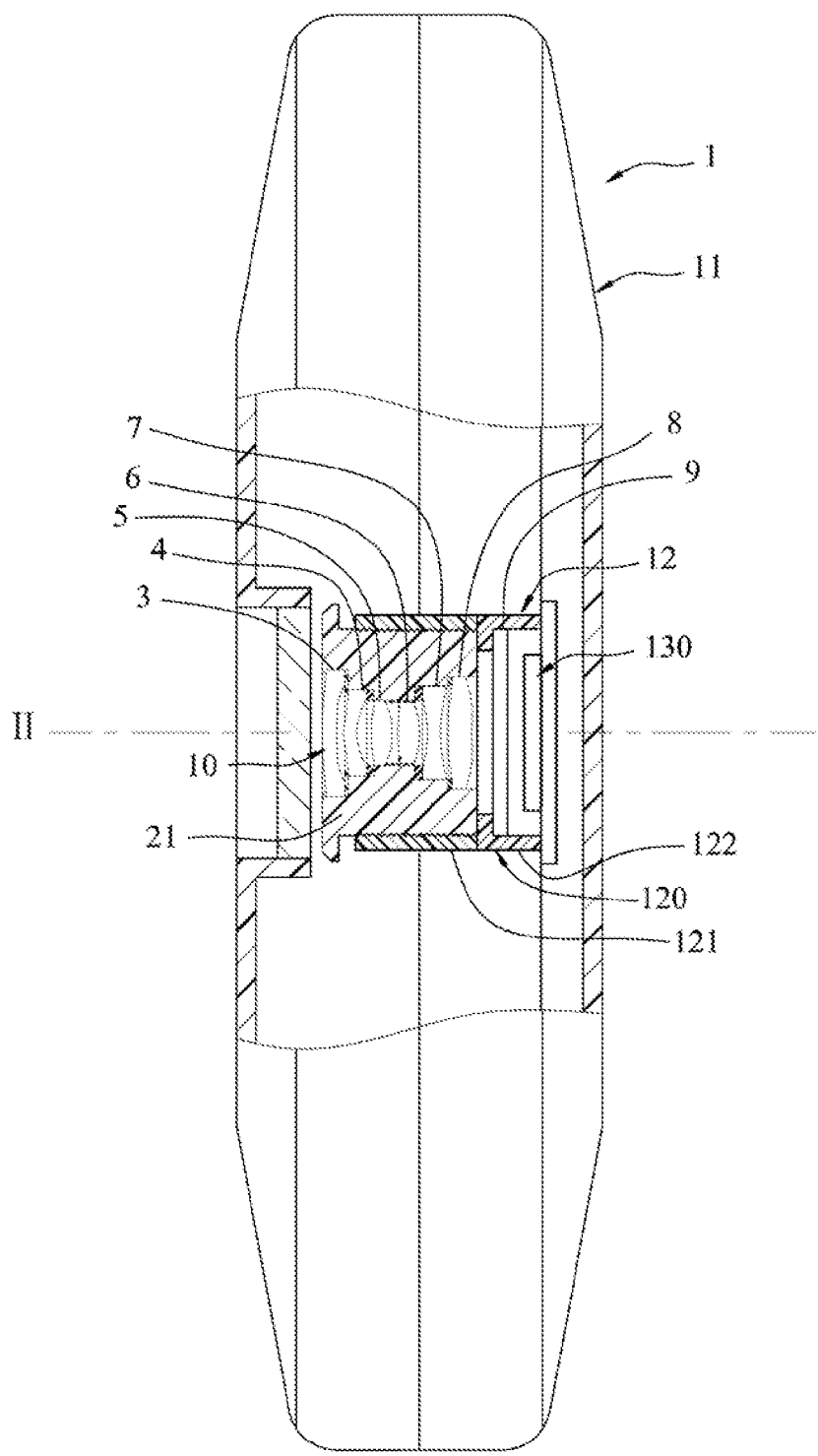
FIG. 32 is a schematic partly sectional view to illustrate a first exemplary application of the imaging lens of the present invention.

Shown in FIG. 32 is a first exemplary application of the imaging lens 10 of this invention, in which the imaging lens 10 is disposed in a housing 11 of an electronic apparatus 1 (such as a mobile phone, but not limited thereto), and forms a part of an imaging module 12 of the electronic apparatus 1. The imaging module 12 includes a barrel 21 on which the imaging lens 10 is disposed, a holder unit 120 on which the barrel 21 is disposed, and an image sensor 130 disposed at the image plane 100 (see FIG. 2).

The holder unit 120 includes a first holder portion 121 in which the barrel 21 is disposed, and a second holder portion 122 having a portion interposed between the first holder portion 121 and the image sensor 130. The barrel 21 and the first holder portion 121 of the holder unit 120 extend along an axis (II), which coincides with the optical axis (I) of the imaging lens 10.

Figure 33:
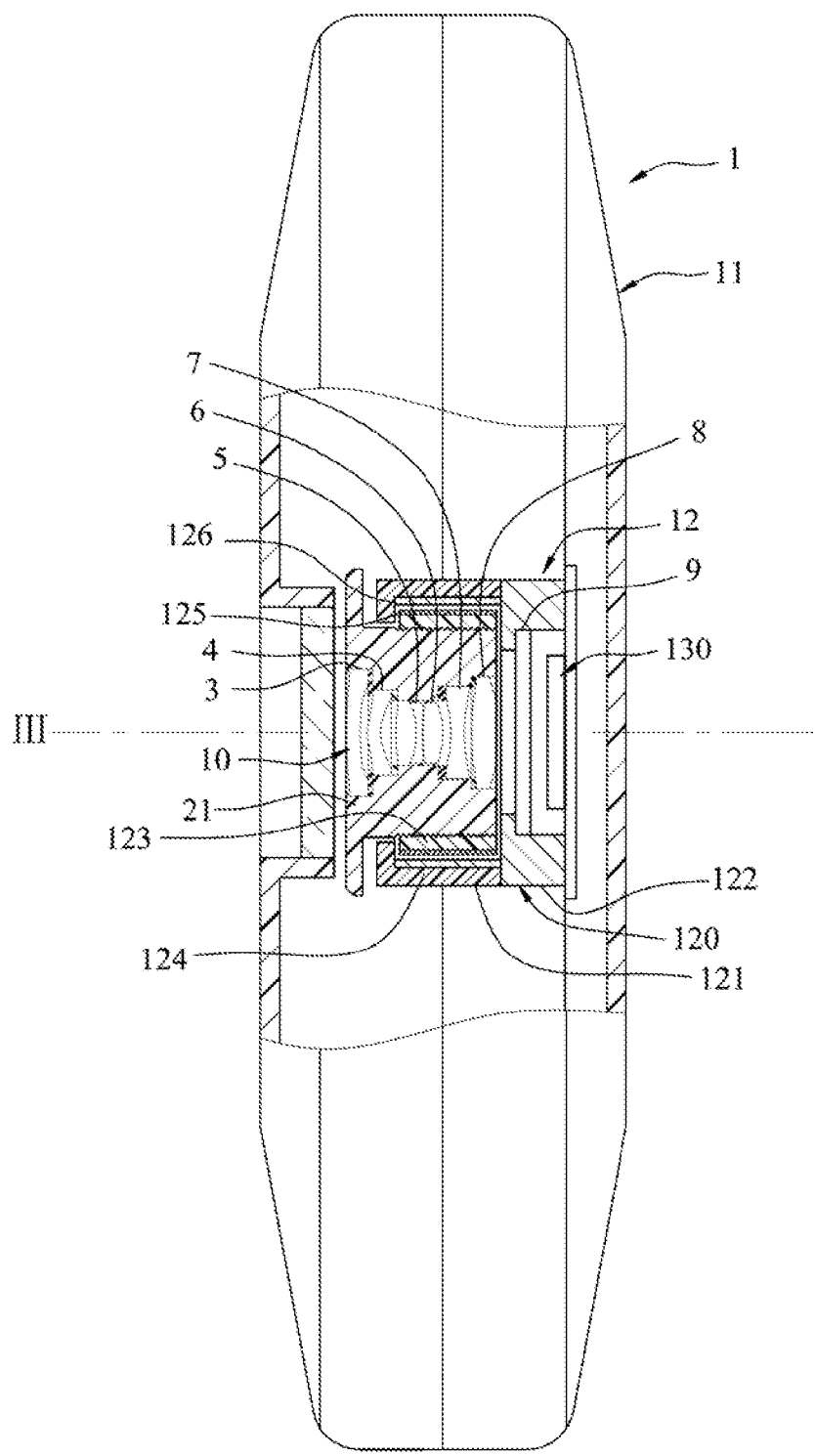
FIG. 33 is a schematic partly sectional view to illustrate a second exemplary application of the imaging lens of the present invention.

Shown in FIG. 33 is a second exemplary application of the imaging lens 10 of this invention. The differences between the first and second exemplary applications reside in that, in the second exemplary application, the holder unit 120 is configured as a voice-coil motor (VCM), and the first holder portion 121 includes an inner section 123 in which the barrel 21 is disposed, an outer section 124 that surrounds the inner section 123, a coil 125 that is interposed between the inner and outer sections 123, 124, and a magnetic component 126 that is disposed between an outer side of the coil 125 and an inner side of the outer section 124.

The inner section 123 and the barrel 21, together with the imaging lens 10 therein, are movable with respect to the image sensor 130 along an axis (III), which coincides with the optical axis (I) of the imaging lens 10. The optical filter 9 of the imaging lens 10 is disposed at the second holder portion 122, which is disposed to abut against the outer section 124. Configuration and arrangement of other components of the electronic apparatus 1 in the second exemplary application are identical to those in the first exemplary application, and hence will not be described hereinafter for the sake of brevity.

By virtue of the imaging lens 10 of the present invention, the electronic apparatus 1 in each of the exemplary applications may be configured to have a relatively reduced overall thickness with good optical and imaging performance, so as to reduce cost of materials, and satisfy requirements of product miniaturization.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An imaging lens comprising a first lens element, a second lens element, a third lens element, an aperture stop, a fourth lens element, a fifth lens element and a sixth lens element arranged in order from an object side to an image side along an optical axis of said imaging lens, each of said first lens element, said second lens element, said third lens element, said fourth lens element, said fifth lens element and said sixth lens element having a refractive power, an object-side surface facing toward the object side, and an image-side surface facing toward the image side, wherein:

said object-side surface of said first lens element has a convex portion in a vicinity of a periphery of said first lens element;

said object-side surface of said second lens element has a convex portion in a vicinity of the optical axis;

said object-side surface of said third lens element has a convex portion in a vicinity of the optical axis, and said image-side surface of said third lens element has a convex portion in a vicinity of the optical axis;

said image-side surface of said fourth lens element has a convex portion in a vicinity of the optical axis;

said fifth lens element is made of a plastic material;

said image-side surface of said sixth lens element has a convex portion in a vicinity of a periphery of said sixth lens element;

said imaging lens satisfies T4/G34≥3.4, where T4 represents a thickness of said fourth lens element at the optical axis, and G34 represents an air gap length between said third lens element and said fourth lens element at the optical axis; and said imaging lens does not include any lens element with refractive power other than said first lens element, said second lens element, said third lens element, said fourth lens element, said fifth lens element and said sixth lens element.

2. The imaging lens as claimed in claim 1, further satisfying G45/T1≥0.3, where T1 represents a thickness of said first lens element at the optical axis, and G45 represents an air gap length between said fourth lens element and said fifth lens element at the optical axis.

3. The imaging lens as claimed in claim 2, further satisfying T2/T1≥0.92, where T2 represents a thickness of said second lens element at the optical axis.

4. The imaging lens as claimed in claim 2, further satisfying T6/T1≥1.8, where T6 represents a thickness of said sixth lens element at the optical axis.

5. The imaging lens as claimed in claim 2, further satisfying EFL/T1≤4.8, where EFL represents a system length of the imaging lens.

6. The imaging lens as claimed in claim 1, further satisfying G56/G23≥0.3, where G23 represents an air gap length between said second lens element and said third lens element at the optical axis, and G56 represents an air gap length between said fifth lens element and said sixth lens element at the optical axis.

7. The imaging lens as claimed in claim 6, further satisfying G45/T2≥0.3, where G45 represents an air gap length between said fourth lens element and said fifth lens element at the optical axis, and T2 represents a thickness of said second lens element at the optical axis.

8. The imaging lens as claimed in claim 6, further satisfying T4/(G12+G23)≥1.3, where G12 represents an air gap length between said first lens element and said second lens element at the optical axis, and T4 represents a thickness of said fourth lens element at the optical axis.

9. The imaging lens as claimed in claim 6, further satisfying $G45/(G23+G36) \geq 0.24$, where G45 represents an air gap length between said fourth lens element and said fifth lens element at the optical axis.

10. The imaging lens as claimed in claim 1, further satisfying $G23/G34 \geq 2.4$, where G23 represents an air gap length between said second lens element and said third lens element at the optical axis.

11. The imaging lens as claimed in claim 10, further satisfying $EFL/T2 \geq 5.1$, where T2 represents a thickness of said second lens element at the optical axis, and EFL represents a system length of the imaging lens.

12. The imaging lens as claimed in claim 10, further satisfying $EFL/G23 \geq 6.0$, where EFL represents a system length of the imaging lens.

13. The imaging lens as claimed in claim 10, further satisfying $T6/(G23+G56) \geq 1.0$, where T6 represents a thickness of said sixth lens element at the optical axis, and G56 represents an air gap length between said fifth lens element and said sixth lens element at the optical axis.

14. The imaging lens as claimed in claim 1, further satisfying $G56/T1 \geq 0.4$, where T1 represents a thickness of said first lens element at the optical axis, and G56 represents an air gap length between said fifth lens element and said sixth lens element at the optical axis.

15. The imaging lens as claimed in claim 14, further satisfying $T2/T1 \geq 0.92$, where T2 represents a thickness of said second lens element at the optical axis.

16. The imaging lens as claimed in claim 14, further satisfying $G45/(G23+G56) \geq 0.24$, where G23 represents an air gap length between said second lens element and said third lens element at the optical axis, and G45 represents an air gap length between said fourth lens element and said fifth lens element at the optical axis.

17. An electronic apparatus comprising:
a housing; and
an imaging module disposed in said housing, and including an imaging lens as claimed in claim 1, a barrel on which said imaging lens is disposed, a holder unit on which said barrel is disposed, and an image sensor disposed at the image side of said imaging lens.

* * * * *